United States Patent
Kawamata

(10) Patent No.: US 11,207,638 B2
(45) Date of Patent: Dec. 28, 2021

(54) METHOD FOR CONCENTRATING COMPRESSED AIR AND APPARATUS FOR CONCENTRATING COMPRESSED AIR

(71) Applicant: JAPAN AIR DRYER SALE Co., Ltd., Tokushima (JP)

(72) Inventor: Hiroyasu Kawamata, Tokushima (JP)

(73) Assignee: JAPAN AIR DRYER SALE CO., LTD., Tokushima (JP)

( * ) Notice: Subject to any disclaimer, the term of this patent is extended or adjusted under 35 U.S.C. 154(b) by 110 days.

(21) Appl. No.: 16/705,974

(22) Filed: Dec. 6, 2019

(65) Prior Publication Data
US 2020/0298173 A1   Sep. 24, 2020

(30) Foreign Application Priority Data
Mar. 19, 2019  (JP) ................ JP2019-51531

(51) Int. Cl.
| | |
|---|---|
| *B01D 53/26* | (2006.01) |
| *B01D 45/06* | (2006.01) |
| *B01D 46/00* | (2006.01) |
| *F04B 39/16* | (2006.01) |
| *B01D 45/02* | (2006.01) |
| *B01D 53/00* | (2006.01) |

(52) U.S. Cl.
CPC ............ *B01D 53/26* (2013.01); *B01D 45/06* (2013.01); *B01D 46/0031* (2013.01); *F04B 39/16* (2013.01); *B01D 2257/80* (2013.01)

(58) Field of Classification Search
CPC .... B01D 53/26; B01D 53/002; B01D 53/265; B01D 45/06; B01D 45/02; B01D 45/08; B01D 46/0031; B01D 2257/80; F04B 39/16
See application file for complete search history.

(56) References Cited

U.S. PATENT DOCUMENTS

| | | | | |
|---|---|---|---|---|
| 6,156,106 | A  * | 12/2000 | Kamata ................ | B01D 45/08 96/189 |
| 2017/0157558 | A1* | 6/2017 | Sugio ................ | B01D 46/0068 |
| 2018/0104630 | A1* | 4/2018 | Miyanaga ............ | F01M 13/04 |
| 2018/0207565 | A1* | 7/2018 | Morishita ............ | B01D 45/08 |

FOREIGN PATENT DOCUMENTS

| | | |
|---|---|---|
| JP | 9-327612 | 12/1997 |
| JP | 10-235132 | 9/1998 |
| JP | 6452763 | 1/2019 |

* cited by examiner

*Primary Examiner* — Robert Clemente
*Assistant Examiner* — Hafiz Muhammad Aamir
(74) *Attorney, Agent, or Firm* — Wenderoth, Lind & Ponack, L.L.P.

(57) ABSTRACT

A concentrating apparatus for concentrating compressed air includes a first hollow cylindrical concentrating unit which is adapted to cause compressed air to: (i) collide with an upstream side of a collision plate so as to be concentrated and partially liquefied; (ii) move to an annular passage and be jetted into an air moving chamber so as to be adiabatically expanded and partially liquefied; (iii) be compressed in an air compressing passage and pushed out so as to retreat along a conical partition wall; (iv) collide with a downstream side of the collision plate so as to be concentrated and partially liquefied; (v) be introduced into an upstream end of an outlet tube; and (vi) move to a downstream end of the outlet tube and into a second hollow cylindrical concentrating unit.

25 Claims, 21 Drawing Sheets

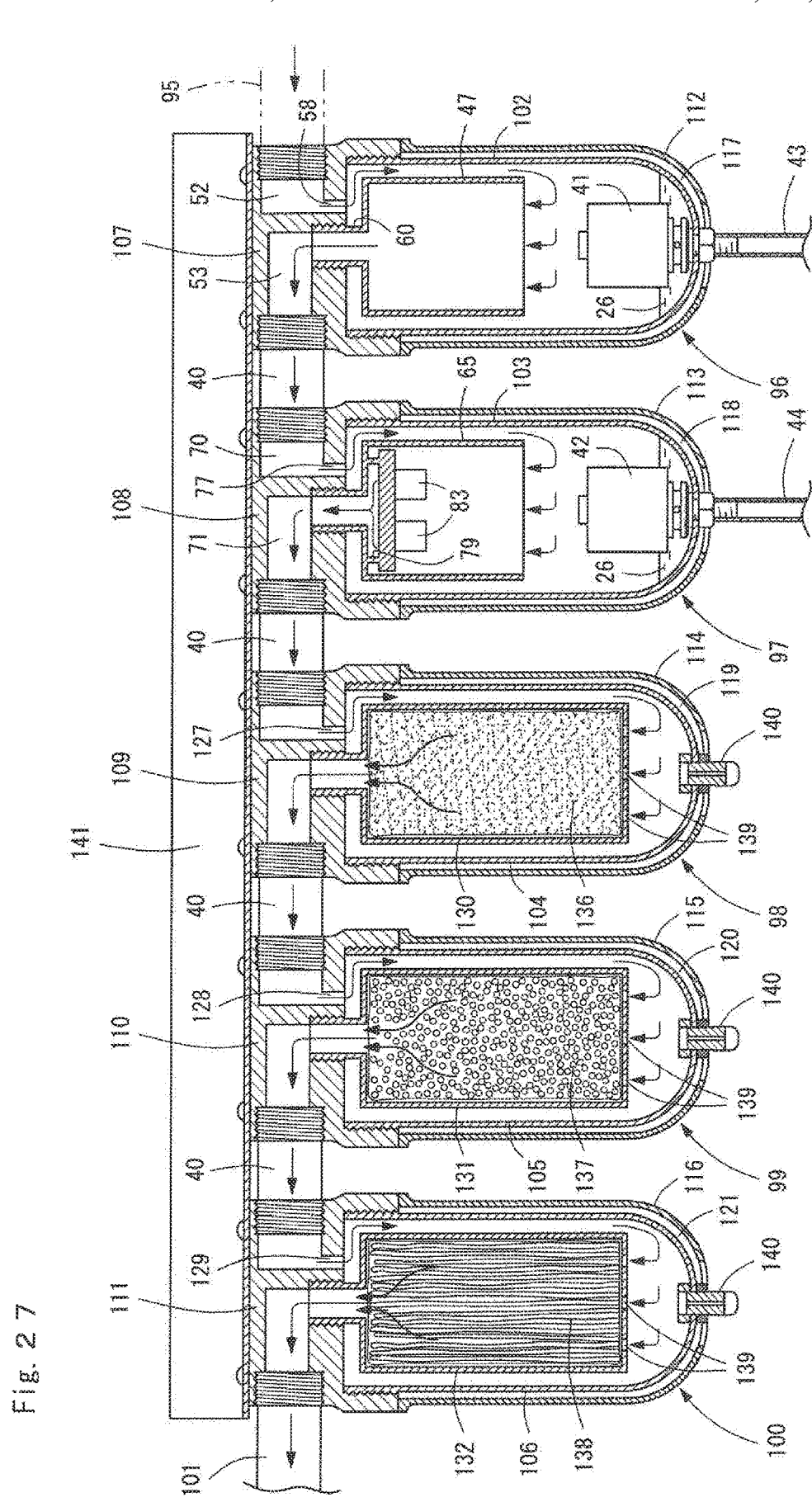

METHOD FOR CONCENTRATING COMPRESSED AIR AND APPARATUS FOR CONCENTRATING COMPRESSED AIR

TECHNICAL FIELD

This invention relates to a method for concentrating compressed air and an apparatus thereof, capable of realizing a novel air dryer, in which a concentrating tube is formed by connecting a plurality of concentrating units, so that the structure, when compared with the conventional one, can be simplified and the number of parts can be reduced by virtue of the concentrating tube, thereby reducing the size and weight, facilitating production and reducing the cost, enabling to obtain not only outstanding concentrating and dehumidifying performance but also convenience, and in which the best concentrating and dehumidifying performance can be obtained easily and freely depending on the environment and conditions where the method and apparatus thus constructed are used, and collection of drain can be performed reasonably and easily.

BACKGROUND ART

The compressed air ejected from an air compressor contains water and oil content mixed with each other. When this compressed air is fed to an air tool such as an air dryer, impact wrench or the like, the inside of the air conduit is rusted or the components inside the air tool are rusted, thereby causing the functional deterioration and failure of the tool. In view of the above-mentioned problems, one attempt is known, in which an air dryer is attached to a feeding conduit to remove moisture, so that compressed air, which has been dehumidified and dried, can be fed to the air tool.

For example, an air dryer is provided with an upper cover attached to the upper part of a hollow cylindrical body, a generally cylindrical partition tube is attached to the interior of the hollow cylindrical body, and a plurality of generally conical partition structures are vertically stacked in the partition tube. Then, the resultant thus obtained is coupled to an air guiding element through long bolts. A concave space and a through-hole are formed in the upper part of each partition structure, compressed air is introduced into the hollow cylindrical body from the upper cover and then moved from the lower partition structure to the upper partition structure so as to be jetted from the through-hole to the upper concave space, so that moisture can be removed by adiabatically expanding the compressed air (see, for example, Japanese Patent Application Publication No. H10-235132)

However, the above conventional air dryer gives rise to such problems that since a partition tube is arranged inside a hollow cylindrical body, a plurality of deformed partition structures are stacked in the partition tube and a small hole-shaped through-hole is formed in each partition structure, the number of parts are increased, and since a concave space and a through-hole are required to be formed in the upper part of each partition structure, the structure is complicated and difficult to manufacture. Moreover, since the compressed air is moved into the partition structures in the partition tube after it is introduced to the hollow cylindrical body, the hollow cylindrical body and partition structures are increased in diameter and become large in size. Moreover, since the partition structures are fixed by through-bolts, the number of the partition structures is restricted by the length of each through bolt and the concentration capacity of the compressed air is limited, thereby making it impossible to remove moisture sufficiently.

To solve those problems, there is a conventional apparatus, in which a cooling tube is arranged in a coil shape in a cooling vessel with water stored therein, its inside diameter is increased or decreased for every moving range, the compressed air moving through the cooling tube is adiabatically expanded and cooled for every moving range, so that the moisture in the compressed air is removed (for example, see Official Gazette of Japanese Patent Application Publication No. H9-327612).

However, the above conventional apparatus for concentrating compressed air has such problems that since the cooling tube is formed in a coil shape and its inside diameter is increased or decreased for every moving range, the cooling tube is difficult to manufacture and the manufacturing cost is increased.

As one attempt to solve the above problems, the present applicant developed an air-liquid separating apparatus, in which a condenser, an air dryer and a plurality of air cleaners are arranged in a feeding tube passage for feeding compressed air to an air tool, a condenser capable of separating air-liquid is arranged on an upstream side of the air dryer and a plurality of air cleaners are arranged on a downstream side of the air dryer, and those component parts comprise a cylindrical bottomed container, a head cover attached to an upper opening of the container and a container cover arranged on the outer side of the container through a clearance part, a plurality of openings are formed in the peripheral surface of the container cover such that the container can be visually recognized through the openings, so that the internal status of the container and the storage status of drain water can be visually recognized, and in addition, a hollow concentrating cylinder is arranged in the cylindrical container of the air dryer, a plurality of air collecting cylinders are arranged on an upper part inside the concentrating cylinder, a small through-hole is formed at the air collecting cylinder so that the compressed air can be adiabatically expanded, and a hollow cylinder is arranged in the condensing cylinder such that the compressed air is vigorously collided with the upper surface inside the condensing cylinder so as to be concentrated, so that the compressed air can be efficiently dehumidified to remove moisture. This apparatus has already been proposed (for example, see Official Gazette of Japanese Patent No. 6452763).

However, the above air-liquid separating apparatus has such problems that since the air dryer and condenser require a cylindrical bottomed container, a head cover attached to an upper opening of the container, a container cover arranged on the outer side of the container, and a concentrating cylinder and condensing cylinder which are arranged inside the cylindrical bottomed container, the number of parts is increased. Moreover, since a small through-hole is formed at the air collecting cylinder of the air dryer, the structure is complicated and the number of parts is increased, much time and labor are required for production and assembly thereof, and the number of the air collecting cylinders is limited by the structures of the concentrating cylinders. Moreover, since the compressed air, which has been introduced to the cylindrical container, is introduced into the condensing cylinder and concentrating cylinder and then into the air collecting cylinder, the cylindrical container, condensing cylinder and concentrating cylinder are increased in diameter. As a result, the overall size is increased. In addition, in case the dehumidifying effect of the compressed air introduced from the air dryer is insufficient, the air clear is unable to exhibit the air cleaning effect sufficiently.

SUMMARY OF INVENTION

It is, therefore, an object of the present invention to provide, in order to solve the above problems, a method for concentrating compressed air and an apparatus thereof, capable of realizing a novel air dryer, in which a concentrating tube is formed by connecting a plurality of concentrating units, so that the structure, when compared with the conventional one, can be simplified and the number of parts can be reduced by means of the concentrating tube, thereby reducing the size and weight, facilitating production and reducing the cost, enabling to obtain not only outstanding concentrating and dehumidifying performance but also convenience, and in which the best concentrating and dehumidifying performance can be obtained easily and freely depending on the environment and conditions where the method and apparatus thus constructed are used, and collection of drain can be performed reasonably and easily.

According to a first aspect of the present invention, a compressed air concentrating method comprising: arranging a single or a plurality of concentrating units in a compressed air movement passage, each unit being provided therein with a collision plate for allowing compressed air to collide therewith and a narrow passage for jetting compressed air, colliding the compressed air with the collision plate so as to be concentrated and partially liquefied, and jetting the compressed air from the narrow passage so as to be adiabatically expanded and partially liquefied, wherein compressed air is introduced directly into a concentrating tube which is formed by connecting a plurality of concentrating units with each other, the concentrating unit, which is spaced apart from the collision plate, is provided therein with an air compressing chamber for pushing the compressed air therein, so that the compressed air is pressurized; and a collision plate for allowing the compressed air, which has been pushed back, to collide therewith, the compressed air being pushed into the air compressing chamber, so that the compressed air is concentrated and partially liquefied, and the compressed air, which has been pressurized in the air compressing chamber, is pushed back toward the collision plate side so as to be collided with the other side of the collision plate, so that the compressed air is concentrated and partially liquefied. Accordingly, concentration effect or dehumidification effect of the compressed air can be obtained through the concentrating tube, collection of drain can be performed reasonably and easily, and the compressed air, which has been dehumidified and dried, can be fed to the air tool, so that failure and functional deterioration of the air tool can be prevented from occurring.

Consequently, the concentrating tube makes it possible that the structure, when compared with the conventional one, can be simplified and the number of parts can be reduced by means of the concentrating tube, thereby reducing the size and weight, facilitating production and reducing the cost, enabling to obtain not only outstanding concentrating and dehumidifying performance but also convenience, and in which the best concentrating and dehumidifying performance can be obtained easily and freely depending on the environment and conditions where the method and apparatus thus constructed are used.

According to a second aspect of the present invention, the plurality of concentrating units are coaxially connected together to form a concentrating tube, and the compressed air is introduced directly into the concentrating tube. Accordingly, the length of the concentrating tube can be adjusted easily by connecting the plurality of concentrating units with screws, for example, so that a wide range of usage forms can be met, and the compressed air is introduced directly into the concentrating tube, so that other introducing tubes than the concentrating tube can be omitted. Consequently, when compared with the conventional air dryer, the size and weight can be made small, the structure can be simplified and the number of parts can be reduced.

According to a third aspect of the present invention, the concentrating tube is installed horizontally or vertically. Accordingly, convenience of usage can be obtained by properly selecting the installation of the concentrating tube depending on the environment of usage. For example, the installation space can be made compact by installing the concentrating tube horizontally.

According to a fourth aspect of the present invention, the narrow passage is formed in an annular shape by an inner peripheral surface of the concentrating unit and an outer peripheral surface of the collision plate. Accordingly, the narrow passage can be manufactured easily in a wide area compared with the conventional narrow passage in which a small hole is formed in a deformed member.

According to a fifth aspect of the present invention, the concentrating tube is arranged on an area near either an upstream side or downstream side of an air dryer, an air-liquid separator or an air cleaner, or both upstream side and downstream side thereof. Accordingly, when the concentrating tube is arranged on a downstream side, the concentrating or dehumidifying effect and the air cleaning action exhibited by any one of the air dryer, etc. can be supplemented, and when the tube is arranged on an upstream side, the concentrating or dehumidifying load caused by any one of the air dryer, etc. can be reduced, and when the tube is arranged on both upstream side and downstream side, the concentrating or dehumidifying effect and the air cleaning action exhibited by any one of the air dryer, etc. can be supplemented, or the concentrating or dehumidifying load caused by any one of the air dryer, etc. can be reduced.

Moreover, since the concentrating tube, which occupies only a small space, exhibits the same function and effect as the air dryer, it works as if an additional air dryer is adopted or the number of air dryers is increased, and the concentrating or dehumidifying effect or the air cleaning action can be enhanced, and the cost for installing the air dryer can be reduced.

According to a sixth aspect of the present invention, each or a properly selected concentrating unit of the horizontally installed concentrating tube is attached at a bottom part thereof with a drain trap in order to collect drain. Accordingly, the drain generated in each concentrating unit can be collected reasonably.

According to a seventh aspect of the present invention, the concentrating tube is installed in such a manner as to be gently inclined toward the downstream side. Accordingly, the drain generated in each concentrating unit can be naturally flowed down by gravity without depending on the drain trap and collected easily.

According to an eighth aspect of the present invention, the concentrating tube is attached at the condensing unit arranged in the most downstream position thereof with a drain trap. Accordingly, the number of the drains to be attached can be reduced and the structure can be simplified. Moreover, the drain flowed down and remained in the concentrating unit at the most downstream position can be collected by the drain trap reasonably.

According to the ninth aspect of the present invention, each concentrating unit is formed at a bottom part thereof with a water passage, each water passage being formed in such a manner as to be able to communicate, and drain, which has flowed down to the concentrating unit arranged in the most downstream position, is collected by the drain trap. Accordingly, the drain can be collected reasonably.

According to the tenth aspect of the present invention, the plurality of concentrating tubes are arranged on an outer periphery of the cylindrical container in a vertical direction and each concentrating tube is annularly arranged for air-cooling. Accordingly, The installation space for the plurality of concentrating tubes can be made compact and the concentrating tubes are air-cooled to cool the concentrating units and compressed air so that the concentrating load of each concentrating unit can be reduced.

According to the eleventh aspect of the present invention, the cylindrical container receives therein cooling water, and the plurality of concentrating tubes are annularly arranged in a vertical direction inside the cylindrical container in such a manner as to be soaked in the cooling water, thereby cooling the concentrating tubes and concentrating units. Accordingly, the cooling effect of the concentrating tubes and concentrating units can be enhanced, and reduction of the concentrating effect of the concentrating units can be enhanced.

According to the twelfth aspect of the present invention, a concentrating apparatus for compressed air comprising: a single or a plurality of concentrating units arranged on a compressed air movement passage, each unit being provided therein with a collision plate capable of allowing compressed air to collide therewith and a narrow passage capable of jetting compressed air, the compressed air being collided with the collision plate so that it is concentrated and can be partially liquefied, the compressed air being jetted from the narrow passage so as to be adiabatically expanded and partially liquefied, wherein compressed air can be introduced directly into a concentrating tube which is formed by connecting a plurality of concentrating units with each other, the concentrating unit, which is spaced apart from the collision plate, is provided therein with an air compressing chamber for pushing the compressed air therein, so that the compressed air can be pressurized; and a collision plate capable of allowing the compressed air, which has been pushed back, to collide therewith, the compressed air being pushed into the air compressing chamber, so that the compressed air can be concentrated and partially liquefied, and the compressed air, which has been pressurized in the air compressing chamber, is pushed back toward the collision plate side so as to be collided with the other side of the collision plate, so that the compressed air is concentrated and can be partially liquefied. Accordingly, the concentrating effect or dehumidifying effect of the compressed air can be obtained in a compact space through the concentrating tube. Moreover, the drain can be collected reasonably and easily, and the compressed air, which has been dehumidified and dried, is fed to the air tool so that failure and functional deterioration of the air tool can be prevented from occurring.

Consequently, the concentration tube, when compared with the conventional one, makes it possible owing to its compact space that the structure is simplified and the number of parts is reduced, thereby reducing the size and weight, facilitating production and reducing the cost, enabling to obtain not only outstanding concentrating and dehumidifying performance but also convenience. Moreover, by increasing or decreasing the number of the concentrating units, the best concentrating and dehumidifying performance can be obtained easily and freely depending on the environment and conditions where the method and apparatus thus constructed are used.

According to a thirtieth aspect of the present invention, the collision plate is formed in a plate shape similar to a cross section of the concentrating unit, the collision plate is arranged at an upstream side within the concentrating unit, and a collision chamber is defined by the collision plate and an upstream side inner surface of the concentrating unit. Accordingly, the collision chamber in a generally closed state can be constituted simply, a reliable collision action against the collision plate can be obtained, and after the collision, smooth movement of the compressed air to the narrow passage can be enhanced.

According to a fourteenth aspect of the present invention, the collision plate is formed in a disc shape, and an annular narrow passage is formed between an outer periphery of the collision plate and the inner surface of the side part of the concentrating unit. Accordingly, when compared with the conventional narrow passage in which a small hole is formed, the structure can be simplified, easy manufacturing can be obtained and the narrow passage can be widened.

According to a fifteenth aspect of the present invention, the concentrating unit is provided at an upstream side end face thereof with an inlet tube projecting therefrom, and further provided at a downstream side inner part thereof with an outlet port, an upstream side end part of the outlet port is arranged near the other side surface of the collision plate, and the upstream side end face of the outlet tube and the downstream side end part of the concentrating unit are partitioned with a conical partition wall. Accordingly, the adjacent concentrating units can be connected with each other easily, and smooth and stable movement and concentrating action of the compressed air can be obtained in the concentrating unit.

According to a sixteenth aspect of the present invention, the air compressing chamber having an acute cross section is formed of the inner surface of an end part of the side peripheral surface of the concentrating unit and the inner surface of the partition wall. Accordingly, push-in of the compressed air with respect to the air compressing chamber and a favorable pressing effect thereof can be obtained.

According to a seventeenth aspect of the present invention, the cross section of the air compressing chamber is formed in a generally V shape. Accordingly, push-in action of the compressed air and pressing effect thereof can be enhanced.

According to an eighteenth aspect of the present invention, a female thread part is formed on an inner surface of the inlet tube and a male thread part is formed on a downstream side peripheral surface of the outlet tube. Accordingly, connection to the adjacent concentrating unit can be performed easily.

According to a nineteenth aspect of the present invention, a male thread part of an outlet tube of an adjacent upstream side concentrating unit is screwed into the female thread part of the inlet tube, and a female thread part of an inlet tube of an adjacent upstream side concentrating unit is screwed into the male thread part of the outlet tube, so that the adjacent concentrating units can be connected with each other. Accordingly, connection to the adjacent concentrating unit can be performed easily and rapidly.

According to a twentieth aspect of the present invention, the plurality of concentrating units are coaxially connected to form the concentrating tube, so that the compressed air can be introduced directly into the concentrating tube.

Accordingly, when compared with the conventional air dryer wherein compressed air is introduced to the concentrating unit using a plurality of members, the number of parts can be reduced and the structure can be simplified so that small size and light weight of the concentrating unit can be obtained. Moreover, pressure loss of the compressed air introduced to the concentrating tube is reduced. so that stable concentrating effect can be obtained.

According to a twenty-first aspect of the present invention, the concentrating tube is installable horizontally or vertically. Accordingly, by properly selecting the form of installation of the concentrating tube, convenience of usage can be obtained. For example, by selecting the horizontal installation form, normal usage can be obtained, and by selecting the vertical installation form of the constructing tube, a compact installation space can be obtained.

According to a twenty-second aspect of the present invention, the concentrating tube is arranged on an area near either an upstream side or downstream side of an air dryer, an air-liquid separator or an air cleaner, or both upstream side and downstream side thereof. Accordingly, when the concentrating tube is installed on a downstream side of an air dryer, an air-liquid separator or an air cleaner, the concentrating effect or dehumidifying effect and air cleaning action exhibited by those tools can be supplemented, and when it is installed on an upstream side, the concentrating load or dehumidifying load and air cleaning action exhibited by those tools can be reduced. Likewise, when it is installed on both upstream side and downstream side, the concentrating effect or dehumidifying effect and air cleaning action exhibited by those tools can be supplemented and the concentrating load or dehumidifying load and air cleaning action exhibited by those tools can be reduced.

Moreover, as mentioned above, since the concentrating tube exhibits the same function and effect as the air dryer, it works as if an additional air dryer is adopted or the number of air dryers is increased, and the concentrating or dehumidifying effect or the air cleaning action can be enhanced, and the cost for installing the air dryer can be reduced.

According to a twenty-third aspect of the present invention, each or a properly selected concentrating unit of the horizontally installed concentrating tube is attached at a bottom part thereof with a drain trap, so that drain can be collected. Accordingly, the drain generated in the concentrating unit can be collected reasonably.

According to a twenty-fourth aspect of the present invention, the concentrating tube is installed in such a manner as to be gently inclined toward the downstream side. Accordingly, the drain generated in each concentrating unit is naturally flowed down by gravity, not by the drain trap, so that the drain can be collected reasonably.

According to a twenty-fifth aspect of the present invention, the concentrating tube is attached, at the condensing unit arranged in the most downstream position thereof, with a drain trap. Accordingly, the attaching number of the drain traps can be reduced and the manufacturing cost can be reduced. Moreover, the drain, which has been flowed down and remained in the concentrating unit in the most downstream position, can be collected re reliably by the drain trap and the compressed air containing moisture can be prevented from being introduced to the adjacent downstream side air tool.

According to a twenty-sixth aspect of the present invention, each concentrating unit is formed at a bottom part thereof with a water passage, each water passage being formed in such a manner as to be able to communicate, and the concentrating unit at the most downstream position is provided with a drain in such a manner as to be able to flow down, and the drain can be collected by the drain trap. Accordingly, the drain in each concentrating unit can be collected easily and reliably.

According to a twenty-seventh aspect of the present invention, the downstream side end part of the most downstream side concentrating unit of the concentrating tube is cut leaving the outlet tube, and the projecting part of the downstream side end part of the outlet tube can be connected to an air dryer or an air-liquid separator. Accordingly, the concentrating unit can be modified by a simple method and connected to the air dryer or air-liquid separator without the need for special parts.

According to a twenty-eighth aspect of the present invention, the plurality of concentrating tubes are arranged on an outer periphery of the cylindrical container in a vertical direction and each concentrating tube is annularly arranged for air-cooling the concentrating tube and concentrating units. Accordingly, the installing space for each of the concentrating tubes can be made compact and the concentrating tubes are cooled to cool the concentrating units. Moreover, the compressed air is cooled so that the concentrating load of each concentrating unit can be reduced.

According to a twenty-ninth aspect of the present invention, the cylindrical container receives therein cooling water, and the plurality of concentrating tubes are annularly arranged in a vertical direction inside the cylindrical container in such a manner as to be soaked in the cooling water, thereby cooling the concentrating tube and concentrating units. Accordingly, the cooling of the compressed air is promoted so that the concentrating load of each concentrating unit can be reduced.

According to a thirtieth aspect of the present invention, the concentrating unit is intimately arranged at a most downstream side end part thereof with an upstream side end face of an adjacent downstream side concentrating unit. Accordingly, their air tightness can be maintained and the concentrating tubes can be connected with each other stably.

BRIEF DESCRIPTION OF DRAWINGS

FIG. 22 is a perspective view showing the fourth embodiment of the present invention, in which a plurality of concentrating tubes are vertically arranged on an inner side of a cylindrical container and immersed in cooling water contained in the cylindrical container.

FIG. 23 is an enlarged sectional view taken on line M-M of FIG. 22.

FIG. 24 is a schematic diagram showing the fifth embodiment of the present invention, in which concentrating units are arranged between an air dryer unit and an air tank which are arranged respectively in the vicinity of the upstream side and the downstream side of the refrigeration type air dryer in an air compressor storage chamber.

FIG. 25 is a front view showing the sixth embodiment of the present invention, in which a concentrating tube, an air dryer and three types of air cleaners are arranged on a compressed air feeding passage in order from the upstream side, and a concentrating tube is arranged between an air tank and the concentrating tube, and between the most downstream part air cleaner and an air tool.

FIG. 27 is an enlarged sectional view taken on line N-N of FIG. 25, showing the internal status of the concentrating tube, air dryer and three types of air cleaners.

EMBODIMENTS OF INVENTION

Figure 1:
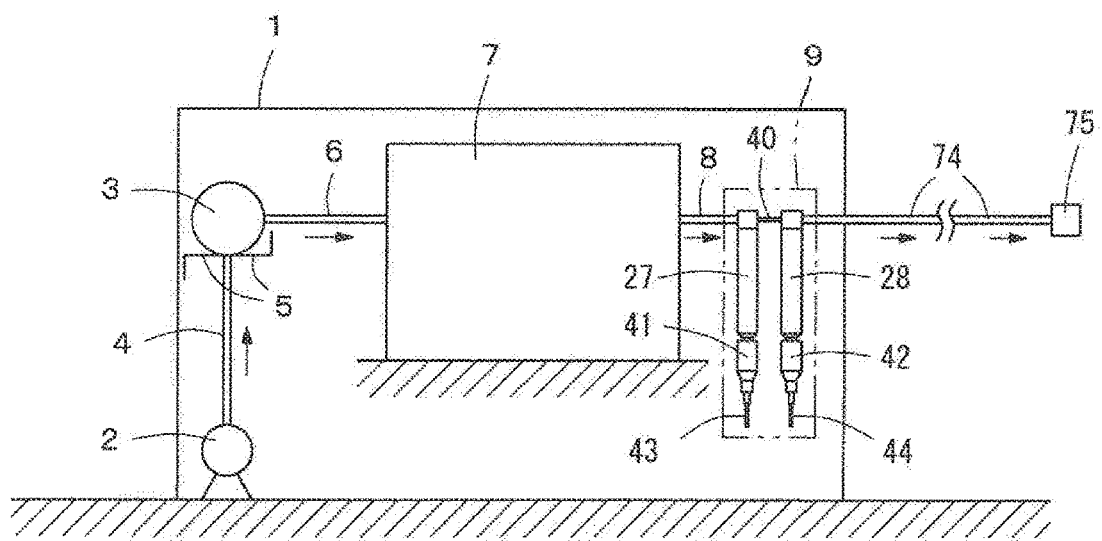
FIG. 1 is a schematic diagram showing an installation status of a concentrating tube according to the first embodiment of the present invention, in which the concentrating tube is arranged between a refrigeration type air dryer placed in an air compressor storage chamber and an air dryer arranged on the downstream side thereof.

Embodiment of the present invention will now be described, in which a refrigerator type air dryer is inserted in a compressed air feeding tube. In FIGS. 1 through 16, reference numeral 1 denotes an air compressor storage chamber set up on a factory site. An air compressor 2 and a cylindrical air tank 3, in which generated compressed air having high temperature and high pressure is stored, are arranged in the compressor storage chamber 1 in such a manner as to be vertically spaced apart from each other. The air compressor 2 and air tank 3 are connected to each other through an air conduit 4. In those FIG. 5 denotes a support frame disposed right under the air tank 3 for supporting the same.

The air compressor storage chamber 1 has a shape like a laterally elongated box which is made of a thin steel plate or aluminum plate. An opening/closing panel (not shown) is openably and closeably, and removably attached to a rear surface or front surface of the chamber 1 through screw, or the like, so that maintenance can easily be performed for such various devices stored in the chamber 1, as the air compressor 2 and air tank 3, a refrigeration type air dryer, an air dryer unit, a coupler for the unit, and an air dryer, all of which will be described later.

The air tank 3 is connected at one side thereof with an air conduit 6 for transferring compressed air, and at another side thereof with a refrigeration type air drier 7 capable of cooling, dehumidifying and drying the compressed air. The air dryer 7 is connected at a feeding side thereof with an upstream side end of a concentrating tube 8.

The concentrating tube 8 is configured by connecting a plurality of concentrating units, as later described, and connected at a downstream end thereof with an air dryer unit 9.

The concentrating tube 8 of this embodiment is configured by connecting six concentrating units 10 in order to have a predetermined length. However, it is desirable to configure the concentrating tube 8 by connecting as many concentrating units 10 as possible depending on the installation environment and installation space, so that moisture contained in the compressed air can be removed efficiently by promoting the condensation effect.

The concentrating unit 10 is provided at one end thereof at the upstream side with an inlet tube 11 projecting therefrom and formed with a female thread part 12 and provided at the other end with an outlet tube 14 which has a male thread part 13 formed on a peripheral surface thereof. An inner side end of the outlet tube 14 is spaced apart from an upstream side end face inside the concentrating unit 10.

By screwing the male thread part 13 of the adjacent upstream side concentrating unit 10 into the female thread part 12 inside the inlet tube 11, and by screwing the female thread part 13 of the adjacent downstream side concentrating unit 10 into the male thread part 12 of the outlet tube 14, the concentrating units 10, 10 are connected together to form one set.

Each concentrating unit 10 is formed in a cylindrical shape by synthetic resin or aluminum diecast, or by bending each component with a stainless steel plate and welding them. Each concentrating unit 10 is formed at a downstream side end face thereof with an annular hole 15. The downstream side end face of each concentrating unit 10 is formed with an annular hole 15, and an outer periphery of the hole 15 is partitioned by a thick engagement wall 16, so that the adjacent concentrating units 10, 10 can be connected with each other firmly and intimately.

An end face of the engagement wall 16 is arranged on the same plane as an end face of the outlet tube 14, and an inner surface of the annular hole 15 is partitioned by a conical partition wall 17 and an innermost part thereof is connected to an inner end part of the outlet tube 14.

A generally conical trapezoidal partition space is formed of the partition wall 17 and the outlet tube 14, and open at the downstream side. The partition space is arranged in such a manner as to project inwardly of the concentrating unit 10, thereby forming a concave air moving chamber 18 within the concentrating unit 10 outside the partition space.

More specifically, the air moving chamber 18 is formed in a variant concave shape for allowing the conical trapezoidal partition space to project therein, and is provided at an inner side thereof with an annular distribution space. The annular width of the distribution space is gradually decreased towards the downstream side end part. The downstream side end part is formed with a narrow air compressing chamber 19. The air introduced into the air compressing chamber 19 is pushed into a bent part thereof and compressed. Then, the compressed air is pushed out toward the upstream side and pushed back to the air moving chamber 18, so that the compressed air can be allowed to collide with the other side surface of the collision plate 20.

A disc-shaped collision plate 20 made of aluminum diecast, which forms a collision plate, is arranged at the upstream side within the air moving chamber 18 and at a position spaced apart from the upstream side end part of the outlet tube 14 in such a manner as to be in parallel with the end face within the concentrating unit 10. The collision plate 20 is formed in a disc shape having a diameter slightly smaller than a cross-section of the inner surface of the air moving chamber 18, and an annular passage 21 having a narrow width is formed between an outer peripheral part thereof and the inner surface of the air moving chamber 18.

A plurality of cylindrical legs 22 project from an end face of the collision plate 20. The other end of each leg 22 is fixed to the inner end face of the concentration unit 10. A collision chamber 23 opening sideward is formed between the inner end face of the concentrating unit 10 and the collision plate 20

Therefore, the compressed air introduced into the inlet tube 11 is moved toward the collision chamber 23 side and collided with the collision plate 20 and concentrated and partly liquefied. The partly liquefied compressed air is moved sideward the collision chamber 23 so as to arrive at the narrow width annular passage 21, and then jetted into the air moving chamber 18 from the annular passage 21 and adiabatically expanded and partially concentrated, cooled and liquefied.

Thereafter, the compressed air is flowed into the air moving chamber 18 from the annular passage 21, moved toward the downstream side along the outer periphery of the chamber 18, pushed into the narrow air compressing chamber 19, which has a narrow tip, and pressurized. After concentrated and partially liquefied, the compressed air is pushed back to the air moving chamber 18 along the tapered wall 17.

The compressed air, which has been pushed back to the air moving chamber 18, is collided with the collision plate 20, concentrated and partially liquefied, and reflected and guided to move into the outlet tube 14, so that it can be moved to the adjacent downstream side concentrating unit 10.

In the Figs., reference numeral 24 denotes a drain discharge hole which is formed at a downstream side bottom surface of a lower part inside the concentrating unit 10. An auto or simple drain trap 25 is attached to the discharge port 24, so that drain accumulated on the bottom within the concentrating unit 10 can be discharged.

In this case, the drain discharge port 14 may be formed, for example, in each, or every other, or every two other concentrating unit 10 depending on the amount of the drain 26 generated.

A product, which is commercially available, is used as the refrigeration type air drier 7 in this embodiment. In this refrigeration type air drier 7, the air conduit 6 is installed within the housing 29, a cooling chamber 30 is arranged at the midstream of the air conduit 6, a communication tube 31 is installed in the cooling chamber 30, and the upstream side end part of the concentrating tube 8 is connected to the downstream side end part of the communication tube 31.

A refrigerant conduit 32 of a refrigeration circuit is installed within the housing 29, a refrigerant compressor 33, a condenser 34, an expansion valve 35 and an evaporator 36 are inserted in the refrigerant conduit 32, and the evaporator 36 is arranged within the cooling chamber 30 such that the compressed air cooled in the cooling chamber 30 can be introduced into a condenser and an air dryer, as later described, which are arranged outside the housing 29 through the communication tube 31.

In Figs., reference numeral 37 denotes drain accumulated on the bottom part at one side within the cooling chamber 30, and a lower end part of a drain discharge tube 38 attached with a sensor (not shown) is embedded in the drain 37 such that the drain 37 can be discharged outside through a discharge valve 39 arranged at an upper part of the drain discharge tube 38.

The air dryer unit 9 includes a condenser 27 and an air dryer 28. The condenser 27 and air dryer 28 are disposed in a proximate relation through a relay tube 40. The condenser 27 is arranged on the upstream side of the air dryer 28.

The condenser 27 and air dryer 28 are formed of cylindrical bodies having generally the same diameter. The processing capability or air flow rate of the condenser 27 and air dryer 28 is 40001/min and is increased to about 13 through 14 times than that of the prior art. Auto or simple drain traps 41, 41 are connected to the area right under the condenser 27 and air dryer 28, so that the drain can be discharged outside the chamber through drain tubes 43, 44.

In this embodiment, the condenser 27 is formed of a hollow cylindrical body having an outside diameter of 90 mm (about 1.2 times of that of the prior art) and a length of about 430 mm (about 2.3 times of that of the prior art). The lower half of the condenser 27 is hollow, so that introduction of the compressed air from an inlet to a cylindrical container, as later described, and introduction and collision of the compressed air from the cylindrical container to the condensing cylinder can be performed smoothly.

The condenser 27 comprises a cylindrical container 45 made of aluminum tube, stainless steel or synthetic resin tube, a head cover 46 made of aluminum diecast or synthetic resin and removably attached to an upper end part thereof, and a condensing cylinder 47 made of hollow cylindrical aluminum tube, stainless steel tube or synthetic resin tube connected at an upper end part thereof to the head cover 46 and arranged inside the cylindrical container 45.

The cylindrical container 45 is formed in a circular tube shape having an outside diameter of 90 mm and a length of 430 mm. A thread part 48 is formed at an upper end part of the cylindrical container 45. A thread part 49 formed at an inner face of a lower end part of the head cover 46 is screwed into the thread part 48.

A lower end part of the cylindrical container 45 is formed in a funnel shape and provided at a center thereof with a through hole 50. A screw pipe 51 made of aluminum tube, stainless steel tube or synthetic resin tube is connected to the through hole 50. By virtue of the foregoing arrangement, the drain flowed to the bottom of the cylindrical container 45 can be moved to the drain trap 41.

The head cover 46 is provided at the opposite positions of the peripheral surface thereof with an inlet 52 and outlet 53. The male thread part 13 of the outlet tube 14 of the concentrating unit 50 is screwed into a screw hole 54 formed at an end part of the inlet 52, while a male thread part 56 of the relay tube 40 is screwed into a screw hole 55 formed at an end part of the outlet 53.

Figure 5:
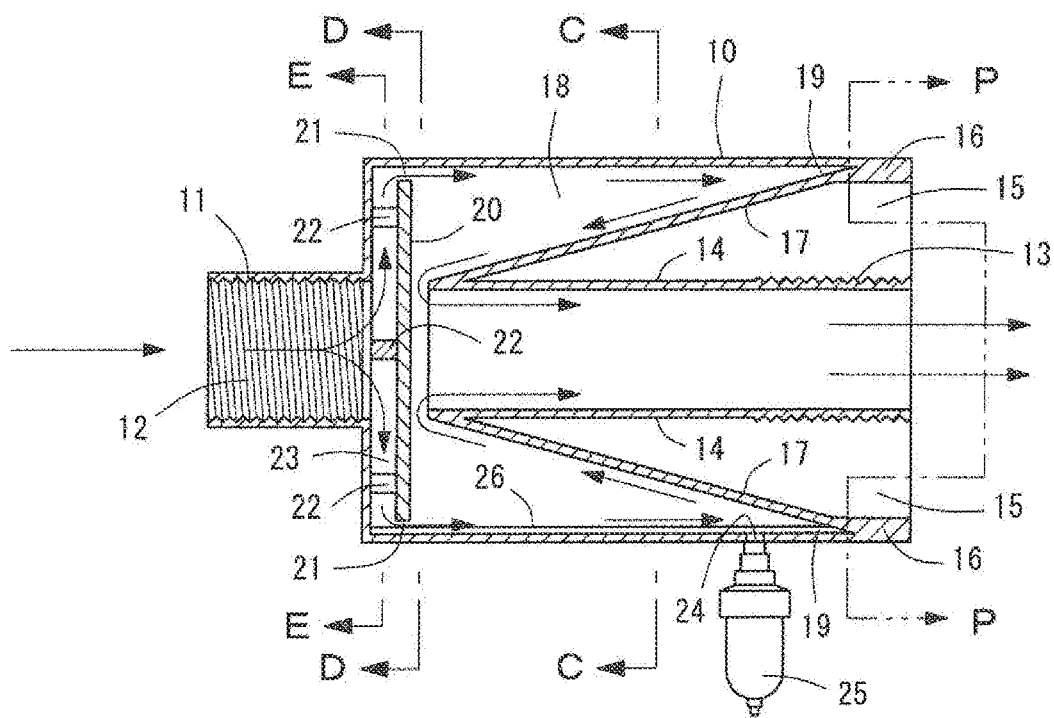
FIG. 5 is a sectional view taken on line B-B of FIG. 4, in which line P-P is a cutting line for modification of a concentrating unit arranged on the most downstream side of the concentrating tube.
Figure 6:
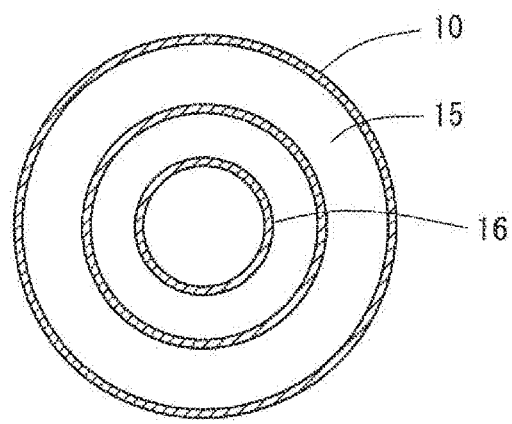
FIG. 6 is a sectional view taken on line C-C of FIG. 5.
Figure 7:
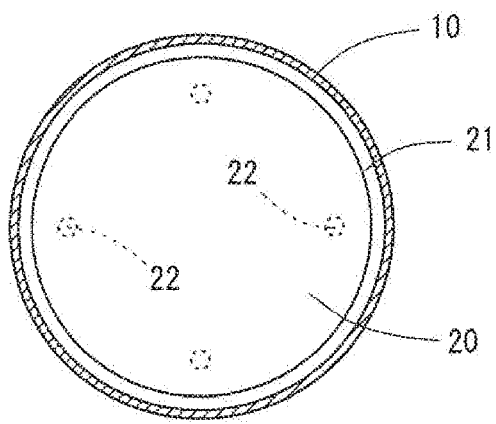
FIG. 7 is a sectional view taken on line D-D of FIG. 5.
Figure 8:
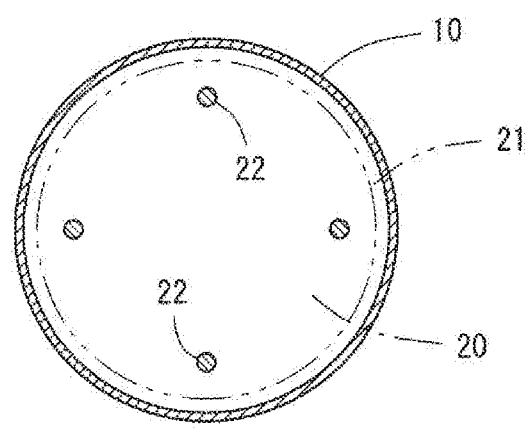
FIG. 8 is a sectional view taken on line E-E of FIG. 5.

In this embodiment, for the convenience of production, the downstream side end part of the concentrating unit 10 of the most downstream side of the concentrating tube 8 is cut along the cut line (taken line) P-P of FIG. 5 leaving the outlet tube 14, and the male thread part 13 of the outlet tube 14, which is left uncut, is screwed into the screw hole 54 of the inlet 52.

The inlet 52 and outlet 53 are partitioned by a partition wall 57, and a passage 58 communicated with the cylindrical container 45 is formed at an inner part of the inlet 52. A screw hole 59 is formed at an inner part of the outlet 53, and a thread part 61 of a connecting tube 60, which is projected from an upper end part of the condensing cylinder 47, is screwed into the screw hole 59.

The condensing cylinder 47 is formed in a hollow cylindrical shape having a smaller diameter than the inside diameter of the cylindrical container 45. The length of the condensing cylinder 47 is approximately ½ of that of the cylindrical container 45. A lower end part of the condensing cylinder 47 is arranged at an intermediate position of the cylindrical container 45. An annular air passage 62 is formed between the condensing cylinder 47 and the cylindrical container 45.

The compressed air introduced from the inlet 52 is guided to the air passage 62 through the passage 58, and then reversed from below the air passage 62 so as to be guided to the condensing cylinder 47. Then, the compressed air is collided with an upper surface within the cylinder 47 and condensed and partially liquefied. Then, the compressed air, which is condensed and partially liquefied, is moved from an upper part of the condensing cylinder 47 to the outlet 53 via the connecting tube 60, so that it can move from the outlet 53 to the relay tube 40.

The air dryer 28 is similar in appearance to the condenser 27. The air dryer 28 comprises a cylindrical container 63 made of aluminum tube, stainless steel tube or synthetic resin tube, a head cover 64 made of aluminum diecast or synthetic resin and removably attached to an upper end part thereof, and a dehumidification cylinder 65 made of hollow cylindrical aluminum tube, stainless steel tube or synthetic resin tube, and connected at an upper end part thereof to the head cover 64 and arranged inside the cylindrical container 63.

The cylindrical container 63 is formed in a circular tube shape having an outside diameter of 90 mm (1.2 times of that of the prior art) and a length of 430 mm (2.3 times of that of the prior art). The container 63 is formed at a peripheral surface of an upper end part thereof with a thread part 66 with which a thread part 67 formed on an inner surface of a lower end part of the head cover 64 is threadedly engaged.

A lower end part of the cylindrical container 63 is formed in a funnel shape and provided at a center thereof with a passage port to which a screw pipe 69 made of aluminum tube, stainless steel tube or synthetic resin tube is connected, so that the drain, that has flowed down to the bottom part of the container 63, can be moved to the drain trap 42.

The head cover 64 is formed in the opposite positions of the peripheral surface thereof with an inlet 70 and an outlet 71, and the end part of the relay tube 40 and a thread part of an air conduit 74 are connected to screw holes 72, 73 formed in the end parts thereof. An air tool 75 within a production factory is connected to an appropriate position of the air conduit 74.

The inlet 70 and the outlet 71 are partitioned by a partition wall 76. A passage 77 communicated with the cylindrical container 65 is formed at an inner part of the inlet 70, and a screw hole 78 is formed at an inner part of the outlet 71. A thread part 80 of a connecting tube 79 projecting from an upper end part of the dehumidification cylinder 65 is screwed into the thread part 78.

The dehumidification cylinder 65 is formed in a hollow cylindrical shape having a smaller inside diameter than that of the cylindrical container 63. The length of the inside diameter of the dehumidification cylinder 65 is approximately ½ of that of the cylindrical container 63. A lower end part of the dehumidification cylinder 65 is arranged at an intermediate position of the cylindrical container 63, and an annular air passage 93 is formed between the dehumidification cylinder 65 and the cylindrical container 63.

The compressed air introduced from the inlet 70 is guided to the passage 77, reversed from below thereof, guided to the dehumidification cylinder 65 and moved from an upper part of the dehumidification cylinder 65 to the outlet 71 via the connecting tube 79, so that the compressed air can be moved from the outlet 71 to the air conduit 74.

A disc-shaped substrate 82 is provided at an upper end part inside the dehumidification cylinder 65 via a connecting cylinder 81, and six air collecting cylinders 83 are projected from a lower surface of the substrate 82 at equiangular positions.

A concave hole 84 is formed at a lower end part of the air collecting cylinder 83. A lower end of a small passage hole 85 is opened in the concave hole 84 and an upper end of the passage hole 85 is opened through the connecting cylinder 81, so that the compressed air is jetted into the connecting cylinder 81 from the passage hole 85 to enable adiabatic expansion. In Figs., reference numeral 93 denotes an annular passage opened between the cylindrical container 63 and the dehumidification cylinder 65.

In thus constructed apparatus for concentrating compressed air according to the present invention, the air compressor storage chamber 1 is installed on the factory premises, an opening and closing panel (not shown) is removably attached to a rear surface or front surface thereof by screws, etc., the air compressor 2 and the supporting frame 5 are vertically spacedly installed at one side in the storage chamber 1, and the air tank 3 is received in the supporting frame 5.

One end of the air conduit 6 is connected to one side of the air tank 3 and the other end thereof is connected to the refrigeration type air dryer 7. One, which is commercially available, is used as the refrigeration type air dryer 7. The refrigeration type air dryer 7 is unmovably installed in the air compressor storage chamber 1. One end part on the outlet side of the communication tube 31 is arranged at an inner wall of the housing 29, and the upstream side end part of the concentrating tube 8 is screwed therein for connection.

The concentrating tube 8 is configured by connecting a plurality of concentrating units 10. In this embodiment, six concentrating units 10 are connected to form the tube 8.

The concentrating unit 10 is formed in a cylindrical shape by synthetic resin or aluminum diecast, or by bending each component with a stainless steel plate and welding them. The concentrating unit 10 is formed at an upstream side end face thereof with the inlet tube 11 projecting therefrom and having the female thread part 12 formed thereon, and at a downstream side end face thereof with the outlet tube 14 having the male thread part 13 formed on its peripheral surface.

An end part of the outlet tube 14 is arranged on the same plane as an end face of the concentrating unit 10, and an inner end part thereof is arranged at an inner part inside the unit 10 and spaced apart from the upstream side end face.

Each concentrating unit 10 is provided with a plurality of legs 22, which are preliminarily adhered or welded to an upstream side end face inside the unit 10. The disk-shaped collision plate 20 adhered or welded to the other ends of the legs 22. A collision chamber 23 having a small height is formed between the upstream side end face and the collision plate 20.

A uniform narrow passage 21 is formed between the inner peripheral surface of each concentrating unit 10 and the outer peripheral surface of the collision plate 20, Each concentrating unit 10 or every other concentrating unit 10 is formed at the lower peripheral surface thereof with a drain discharge hole 24, and each discharge hole 24 is attached with a drain trap 25.

As described above, since the narrow passage 21 is formed by fixing the collision plate 20 to a predetermined position inside the concentrating unit 10 through the legs 22, and setting the outer periphery of the collision plate 20 and the inner surface of the side periphery of the concentrating unit 10 to a predetermined small width, it can be simplified in structure and easily produced compared with the conventional method in which a small hole is formed in a predetermined position of the component member.

Moreover, the concentrating tube 8 has such a structure that the compressed air can be introduced directly therein, the number of the component members can be reduced, it can be produced easily and inexpensively, and a compact size of the concentrating tube 8 can be achieved by realizing a reduced diameter and a reduced weight compared with the conventional structure in which the concentrating tube 8 is provided at its outside with an additional introducing tube and guiding tube and the compressed air is introduced therebetween.

In order to connect the plurality of condensing units 10 thus constructed, the female thread part 12 inside the inlet tube 11 of the concentrating unit 10 is screwed therein by the male thread part 13 of the outlet tube 14 of the adjacent upstream side concentrating unit 10, and the male thread part 13 of the outlet tube 14 is screwed thereto by the female thread part 12 inside the inlet tube 11 of the adjacent downstream side concentrating unit 10.

The most downstream side concentrating unit 10 is made by cutting the periphery of the engagement wall 15 along the cut line (taken line) P-P of FIG. 5 leaving the downstream side outlet tube 14 and projecting the outlet tube 14.

Then, the male thread part 13 of the projecting outlet tube 14 is screwed into the screw hole 54 of the inlet 52 of the head cover 46 of the condenser 27 when the concentrating tube 8 is installed.

Figure 2:
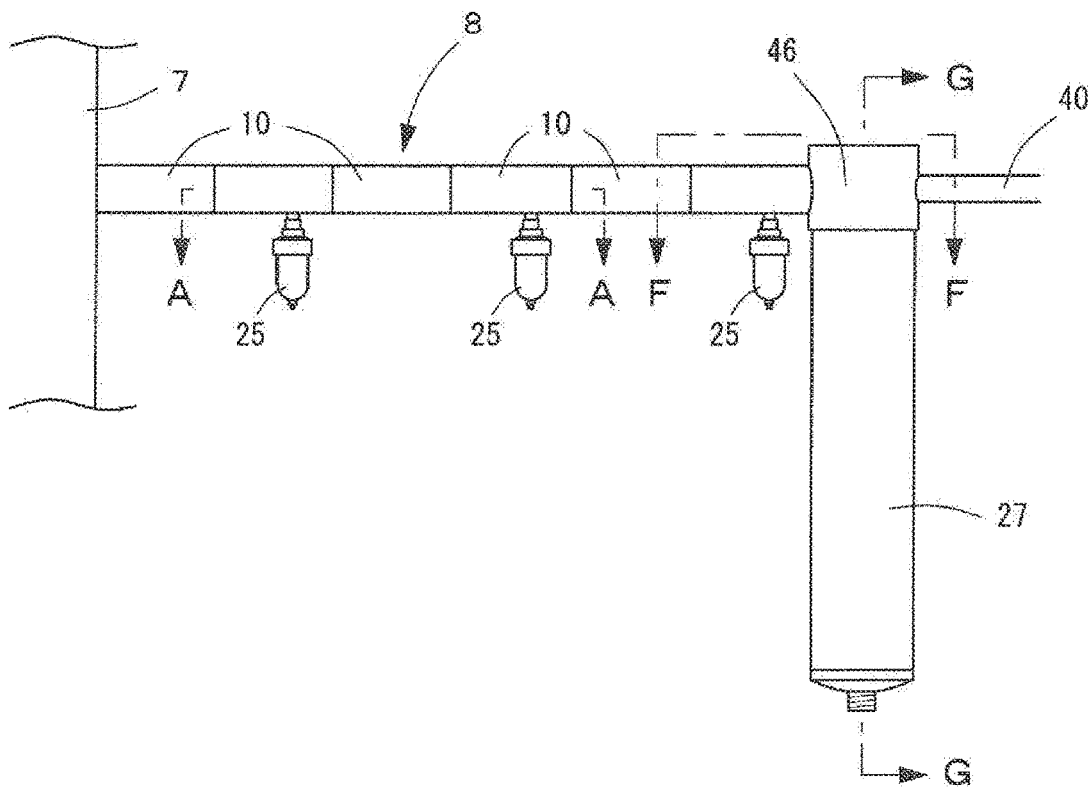
FIG. 2 is a front view showing, in an enlarged scale, the installation status of the concentrating tube of FIG. 1.
Figure 3:
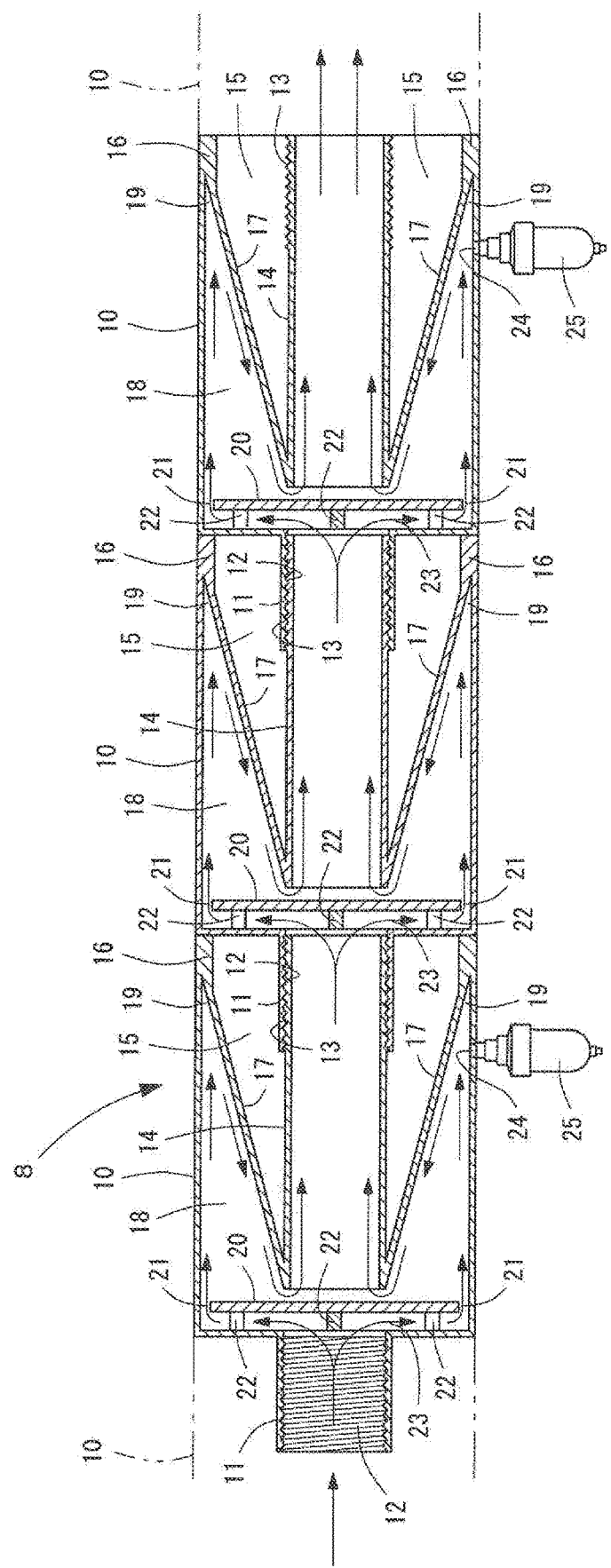
FIG. 3 is an enlarged sectional view taken on line A-A of FIG. 2.
Figure 4:
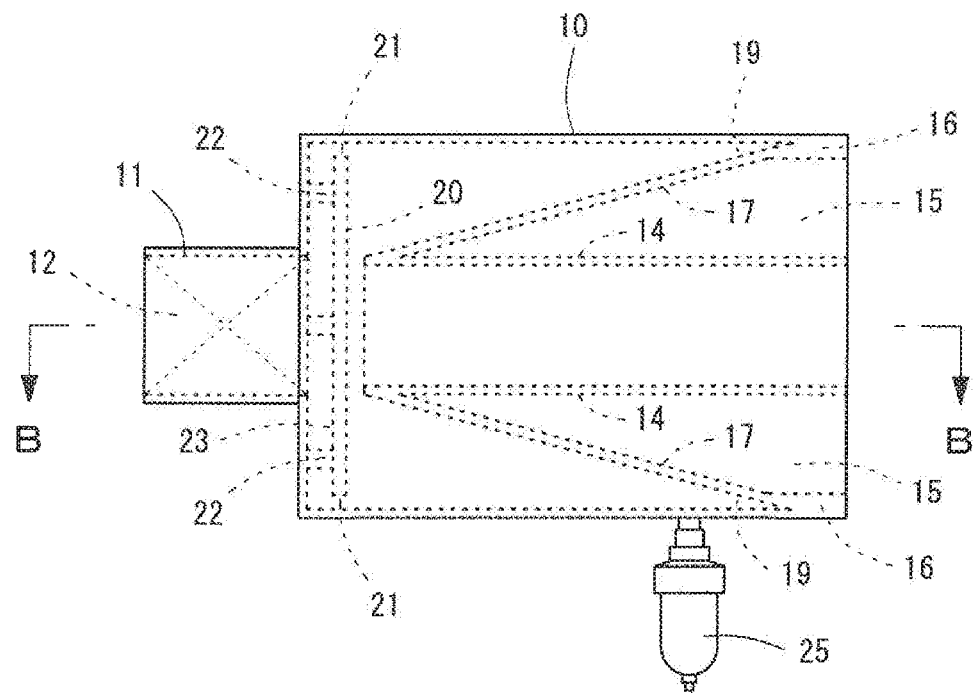
FIG. 4 is a front view showing, in an enlarged scale, a concentrating unit which is applied to the present invention.

The concentrating tube 8 connected in this way is as shown in FIGS. 2 and 3, in which the each concentrating unit 10 is arranged in the axial direction, the end face of each engagement wall 16 is engaged with the adjacent downstream side outer end face, and the male thread part 13 of the outlet tube 14 is intimately connected with the female thread part of the downstream side inlet tube 11.

Figure 9:
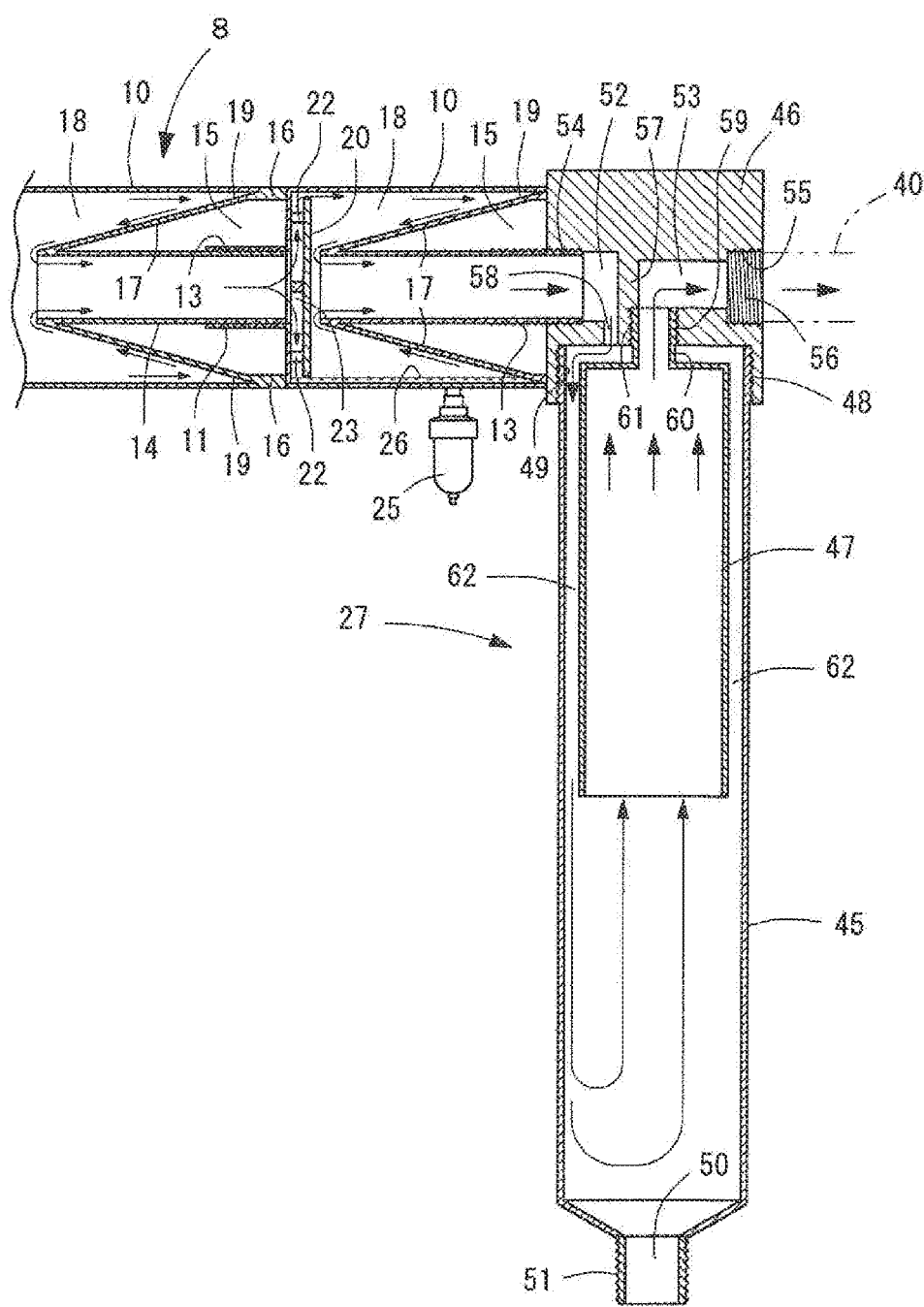
FIG. 9 is an enlarged sectional view taken on line F-F of FIG. 2.
Figure 10:
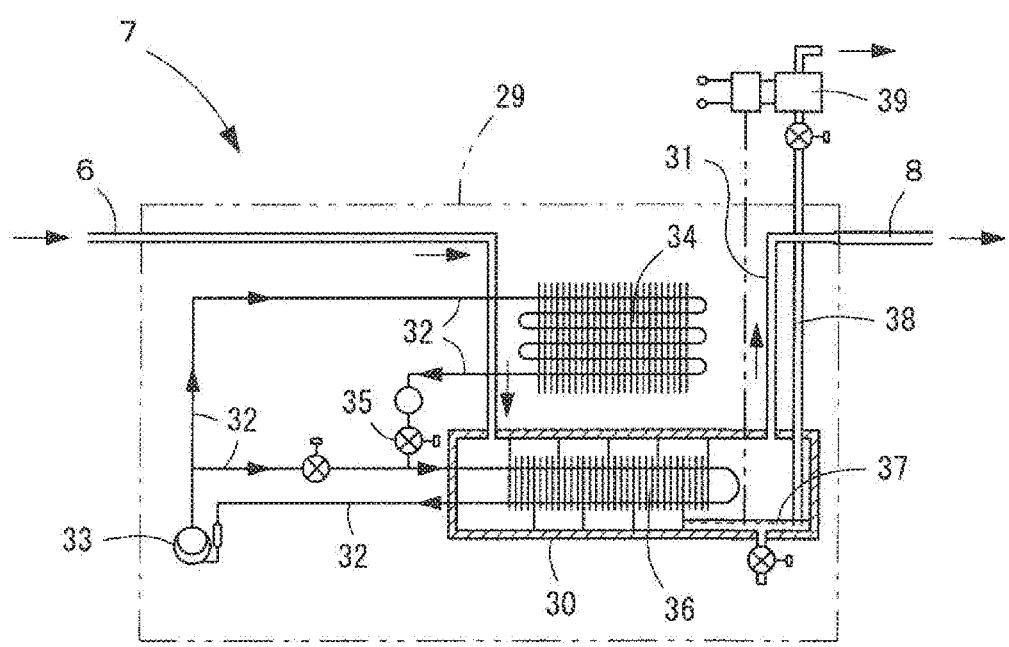
FIG. 10 is a schematic diagram showing a refrigeration type air dryer which is applied to the present invention.
Figure 11:
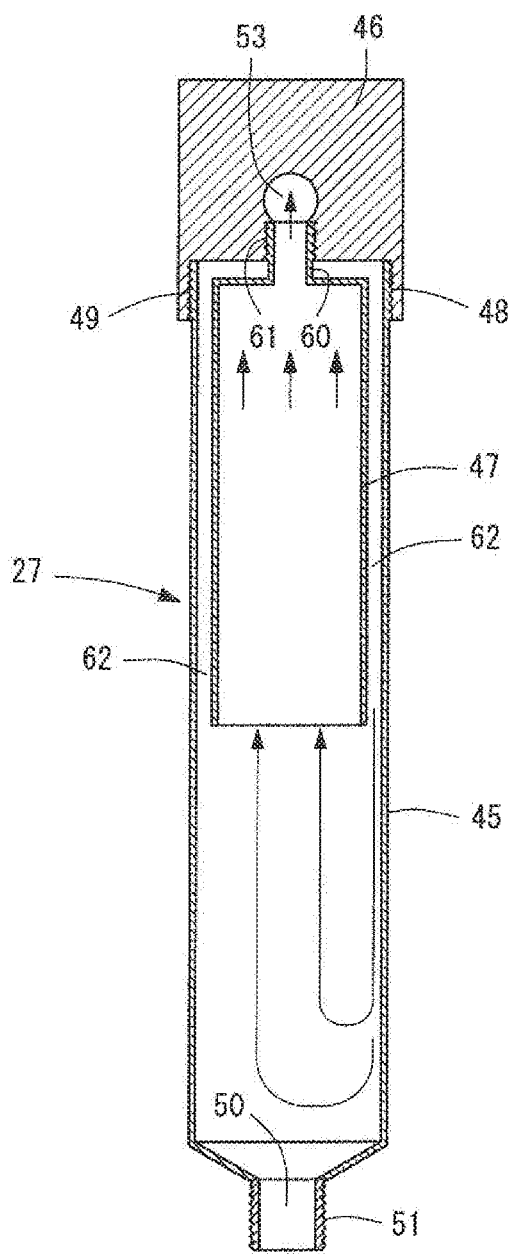
FIG. 11 is an enlarged sectional view taken on line G-G of FIG. 2.
Figure 12:
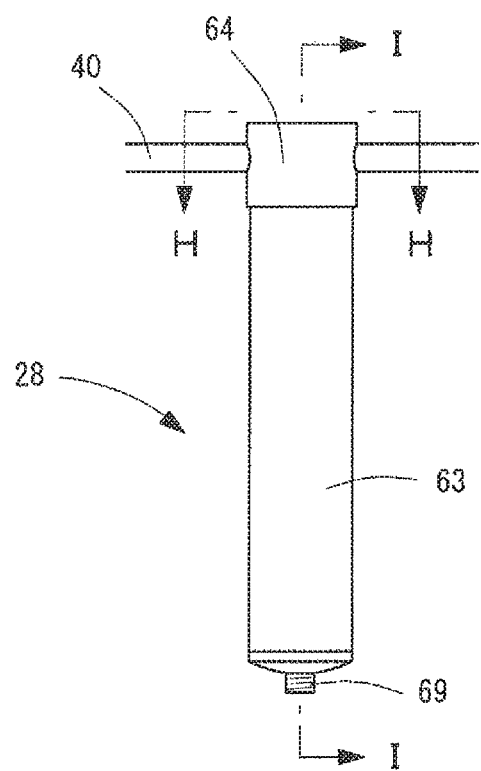
FIG. 12 is a front view showing a condenser of an air dryer unit which is applied to the present invention.
Figure 13:
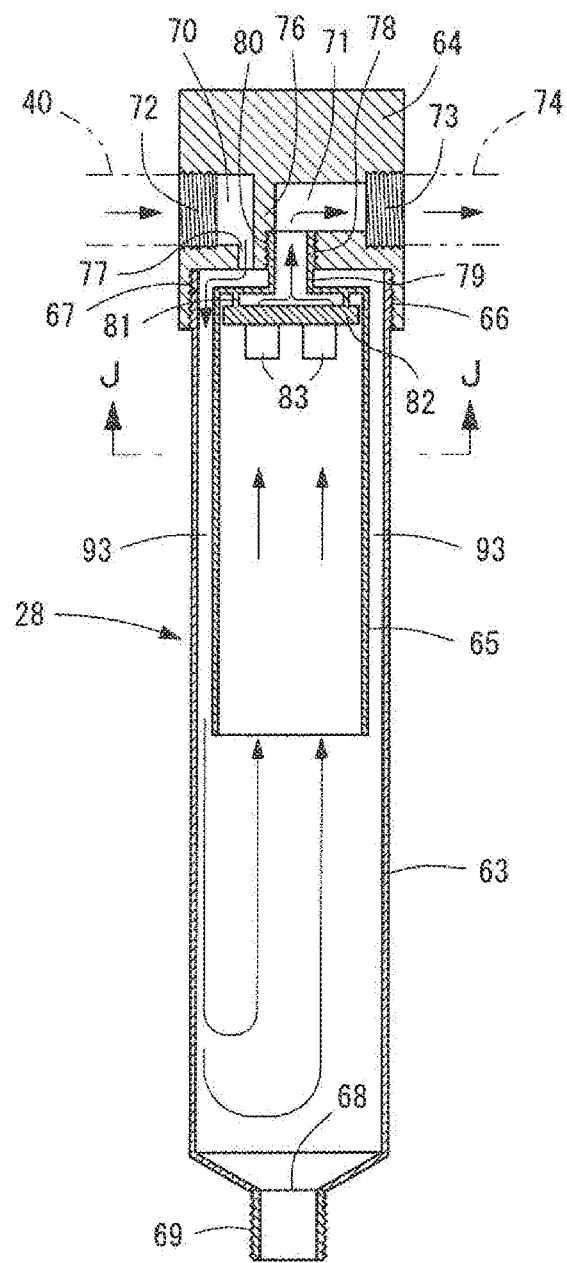
FIG. 13 is an enlarged sectional view taken on line H-H of FIG. 12.
Figure 14:
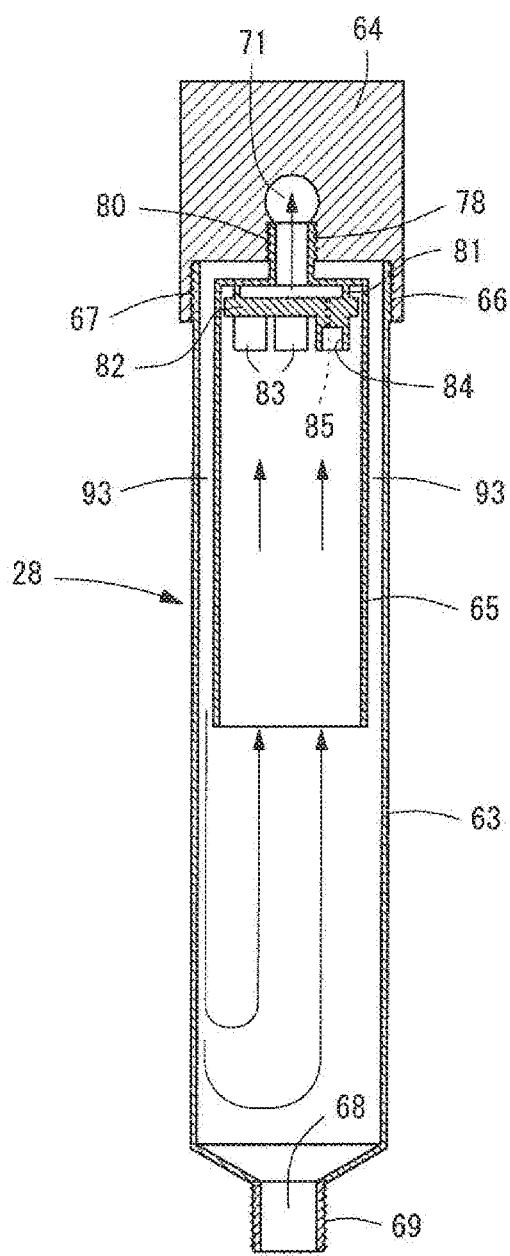
FIG. 14 is an enlarged sectional view taken on line I-I of FIG. 12.
Figure 15:
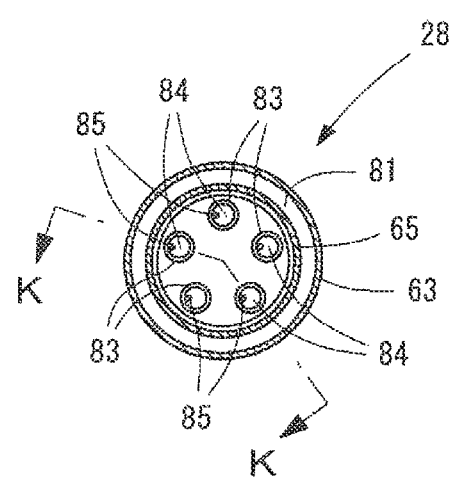
FIG. 15 is an enlarged sectional view taken on line J-J of FIG. 13.
Figure 16:
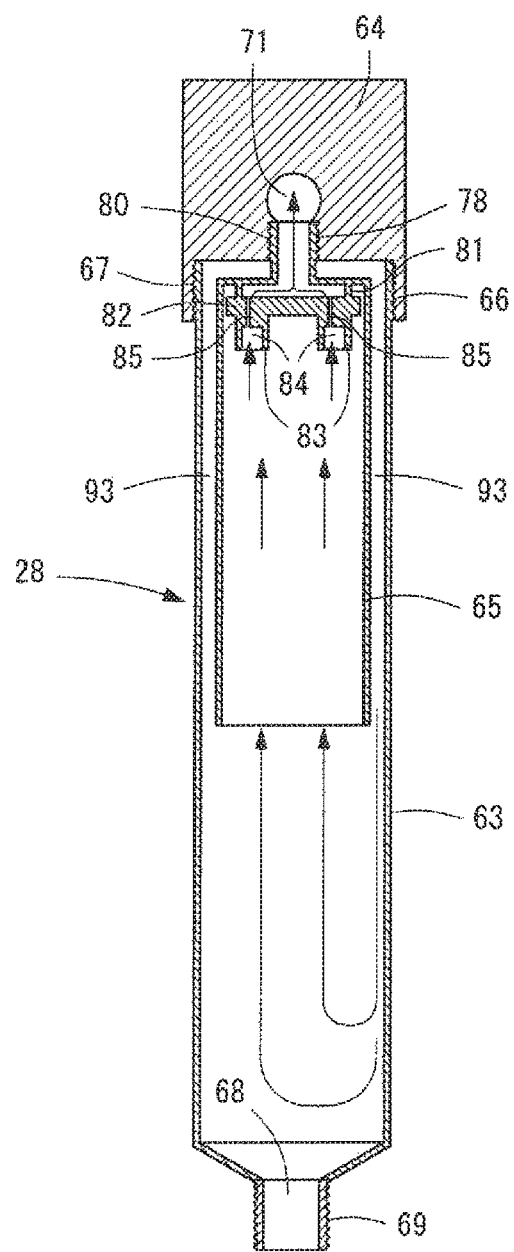
FIG. 16 is an enlarged sectional view taken on line K-K of FIG. 15.

Thereafter, the concentrating tube 8 is installed between the refrigeration type air dryer 7 and the condenser 27 of the air dryer unit 9. At that time, one end of the concentrating tube 8, in other words, the female thread part 12 inside the inlet tube 11 of the most upstream side concentrating unit 10 is screwed to and connected with the male thread part (not shown) on the outlet side end part of the communication tube 31 of the refrigeration type air dryer 7. The other end of the concentrating tube 8, in other words, the male thread part 13 of the outlet tube 14 of the modified most downstream side concentrating unit 10 is screwed into the screw hole 54 of the head cover 46 of the condenser 27 for connection. This status is as shown in FIGS. 2 and 9.

Then, the male thread part 56 on the one end of the relay tube 40 is screwed into the screw hole 55 of the outlet 53 of the condenser 27, and the male thread part on the other end of the relay tube 40 is screwed into the screw hole 72 of the head cover 64 of the air dryer 28, so that the air dryer 28 is connected to the condenser 27.

Thereafter, the thread part of the air conduit 74 is screwed into the screw hole 73 of the outlet 71 of the air dryer 28, the other end of the air conduit 74 is installed within the factory, tributary conduits (not shown) are connected to appropriate positions thereof, and the tributary conduits are connected with various types of air tools 75.

In the apparatus for concentrating compressed air thus constructed, when the compressed air of a high temperature and high pressure (approximately 50 to 80□ and 0.1 to 1.5 MPa) within the air tank 3 is sent to the refrigeration type air dryer 6 through the air conduit 5, the compressed air is moved to the cooling chamber 30 inside the housing 29 and cooled, the water vapor in the compressed air is condensed and its drain 37 is stored on the bottom part on one side of the cooling chamber 30, and the cooling air, which has been dehumidified is sent out to the communication tube 31, moved to the concentrating tube 8 outside the housing 29 and guided into the most upstream side concentrating unit 10.

The compressed air introduced to the inlet tube 11 is moved toward the collision chamber 23 side and collided with the collision plate 20, then partially concentrated and liquefied, moved from the collision chamber 23 to the outer periphery of the collision plate 20, and jetted from the annular narrow passage 21 to the air moving chamber 18. At that time, the compressed air is adiabatically expanded and partially cooled, concentrated and liquefied.

Thereafter, the compressed air is moved along the outer periphery inside the air moving chamber 18 and pushed into the air compressing chamber 19 having a narrow tip so as to be pressurized and partially liquefied.

Thereafter, the compressed air is pushed into the air compressing chamber 19 by the incoming compressed air, pushed back to the air moving chamber 18 along the tapered wall 17 and collided with the inner surface of the collision plate 20 so as to be concentrated and partially liquefied. After the collision, the compressed air is reflected from the collision plate 20, promoted to move in the direction of the outlet tube 14 and moved through the interior of the outlet tube 14 so as to move to the downstream side concentrating unit 10.

As described above, the compressed air is collided with the collision plate 20 twice, once with the inner surface and second with the outer surface thereof within the first concentrating unit 10, and moisture is removed from the compressed air through concentration and condensation. Further, when jetted to the annular passage 21, the compressed air is adiabatically expanded, cooled and concentrated. Then, the compressed air is pushed into the air compressing chamber 19 and concentrated, so that moisture is precisely removed from the compressed air. As a result, the compressed air is further concentrated and dehumidified Consequently, the concentrating unit 8 exhibits the same degree of concentration and dehumidification effect as in the case with the conventional air dryer, thus enabling it to function as a novel air dryer.

At that time, the drain, which has been produced when the compressed air is liquefied by being concentrated or cooled, is flowed down stayed on the lower part inside the concentrating unit 10 and collected by the drain trap 25 and discharged.

In the concentrating unit provided with no drain trap 25, the drain, which has been generated in the upstream side concentrating unit 10, is mixed with the compressed air and moved through the interior to the adjacent downstream side concentrating unit 10, and then, flowed down together with the drain 26, which has been generated in the concentration unit 10, and stayed on the lower part, and thereafter collected by the drain trap 25 and discharged.

The compressed air, that has moved through the interior of the plurality of concentrating units 10 in this way, is reliably and precisely dehydrated and precisely dehumidified.

Moreover, the concentrating tube 8 is necessarily provided at the most downstream side concentrating unit 10 on its downstream part with the drain trap 25. Owing to this structural arrangement, the moisture in the concentrating tube 8 is completely removed and collected, so that the dehumidified compressed air is sent to the air dryer unit 9.

Consequently, the concentrating unit 10 or the concentrating tube 8 complements the dehumidifying action performed by the upstream side refrigeration type air dryer, promotes the removal of moisture in the compressed air and enhances the dehumidifying effect.

The compressed air, which has been moved to the concentrating tube 8, is sent to the upstream side condenser 27 of the air dryer unit 9, flowed into the cylindrical container 4 from the passage 58 at the inner part of the inlet 52 and moved downward through the annular passage 62 between the cylindrical container 45 and the condensing cylinder 47.

Then, the compressed air is reversed and moved upward from below the cylindrical container 45, guided into the condensing cylinder 47, collided hard with the upper surface thereof and partially liquefied to produce drain.

The drain is flowed down along the respective inner surfaces of the condensing cylinder 47 and the cylindrical container 45, dropped through the passage hole 50 and stayed in the drain trap 41. The overflow is guided to the drain tube 43 and discharged outside.

The compressed air, which has been effectively dehumidified by the condenser 27, is sent out to the relay tube 40, moved to the adjacent downstream side air dryer 28, flowed into the cylindrical container 63 from the passage 77 at the inner part of the inlet 70, and moved downward through the annular passage 93 between the cylindrical container 63 and the dehumidification cylinder 65.

The compressed air is reversed from below the cylindrical container 63, guided into the dehumidification cylinder 65, moved to the concave hole 84 of an air collection cylinder 88 at its upper part, and vigorously jetted into the connecting cylinder 81 from the passage hole 85 open to the concave hole 84.

At that time, the compressed air is adiabatically expanded, cooled and concentrated so as to be partially liquefied. Then, the droplet drops along the air collection cylinder 83 and the dehumidification cylinder 65 and stored in the drain trap 42.

The compressed air, which has been dehumidified or dried by the air dryer 28, is moved to the outlet 71 via the connecting tube 79, moved from the outlet 71 to the air conduit 74 and fed to the respective air tools 75 in the factory located on its downstream side.

Therefore, the compressed air having high temperature and high pressure, which has been fed from the air tank 3, is cooled and dehumidified in the refrigeration type air dryer 7, repeatedly concentrated and adiabatically expanded in each concentrating unit 10 of the concentrating tube 8 so as to be cooled and dehumidified, dehumidified and cooled once again by the condenser 27 and air dryer 28 of the air dryer unit 9 so as to be dehydrated, and fed to the air tool 75. As a result, the air tool 75 can be definitely prevented from occurring functional deterioration and mechanical trouble.

Moreover, according to the present invention, the air compressor 2, the air tank 3, the compressed air conduit 5, the refrigeration type air dryer 7, the concentrating tube 8 and the air dryer units 9 are stored in the air compressor storage chamber 1, so that the equipment can be protected from the external environment and favorable operation thereof can be maintained so as to improve the equipment life.

Furthermore, the condenser 27 of the air dryer unit 9 and the air dryer 28 are disposed in a proximate relation, so that the air compressor storage chamber 1 can be made compact.

FIGS. 17 through 27 show other embodiments of the present invention, wherein the parts corresponding to those of the previous embodiment are denoted by like reference numerals throughout.

Figure 17:
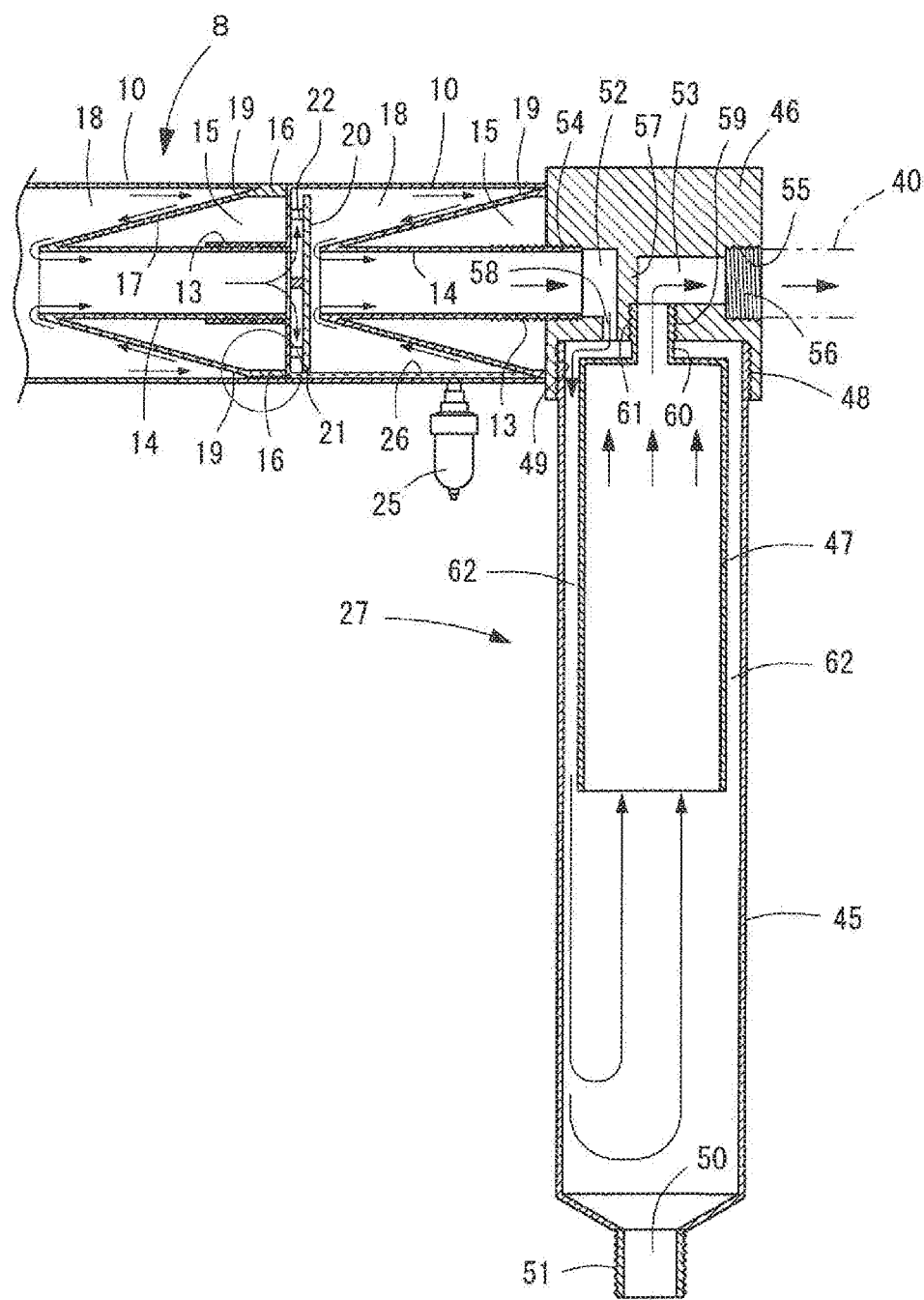
FIG. 17 is a sectional view showing an important part of the second embodiment of the present invention, showing, in an enlarged scale, a connection status between a concentrating unit arranged, in a slightly inclined posture, on the most downstream side of a concentrating tube and a condenser of an air dryer unit.
Figure 18:
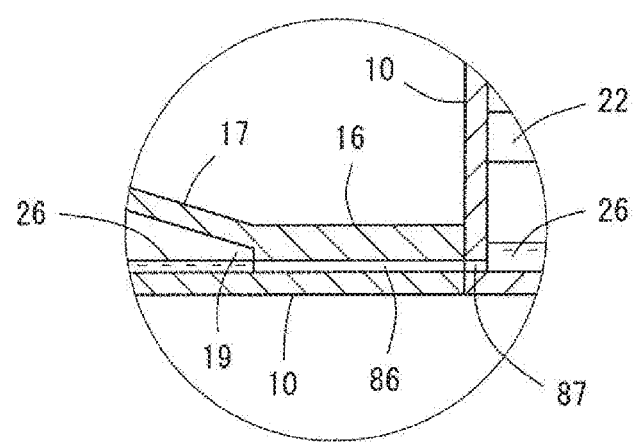
FIG. 18 is a sectional view showing, in an enlarged scale, an encircled part of FIG. 17.

Of those Figs., FIGS. 17 and 18 show the second embodiment of the present invention, wherein the condensing tube 8 is installed on the downstream side gently in a posture facing slant-wise downward between the refrigeration type air dryer 7 and the head cover 46 of the condenser 27.

The engagement wall 16 at the lower part of each concentrating unit and an end face of the adjacent downstream side concentrating unit 10, which is engaged with the engagement wall 16, are formed with water passage holes 86, 87 so as to be communicated with each other.

By doing so, the drain 26, which has generated in each concentrating unit 10, is flowed down to an inner surface at a lower part of the concentrating unit 10, flowed into an inner surface at a lower part of the adjacent concentrating unit 10 through the water passage holes 86, 87 and collected and discharged by the drain trap 25 together with the drain 26 remained in the most downstream side concentrating unit 10.

That is, in this embodiment, the concentrating tube 8 is, as in the preceding embodiment, provided with a plurality of drain traps 25 in order to prevent mixing and remaining of the compressed air and drain 26 in the concentrating units 10, thereby preventing the reduction of moving speed and concentrating action of the compressed air, reducing the number of parts and simplifying the structure, and simplifying the drain discharging structure and collection so as to surely discharge it.

Figure 19:
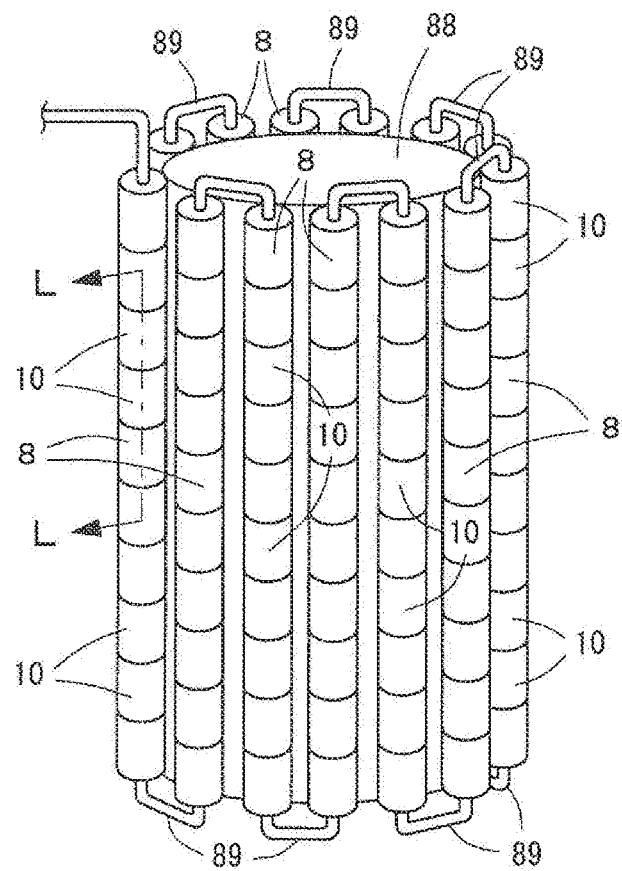
FIG. 19 is a perspective view showing the third embodiment of the present invention, in which a plurality of concentrating tubes are vertically arranged along an outer peripheral surface of a cylindrical container and cooled.
Figure 20:
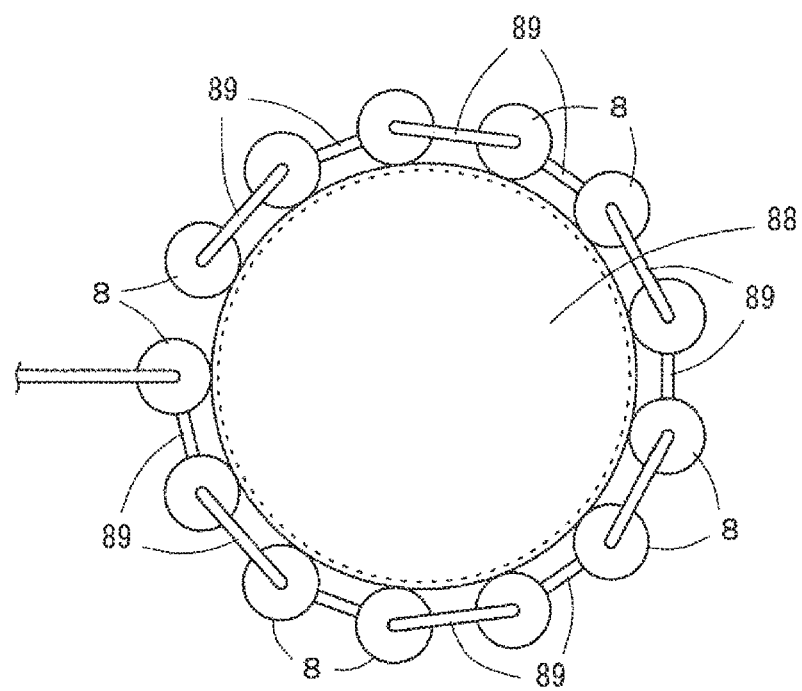
FIG. 20 is a plan view of FIG. 19, showing, in an enlarged scale, the third embodiment.
Figure 21:
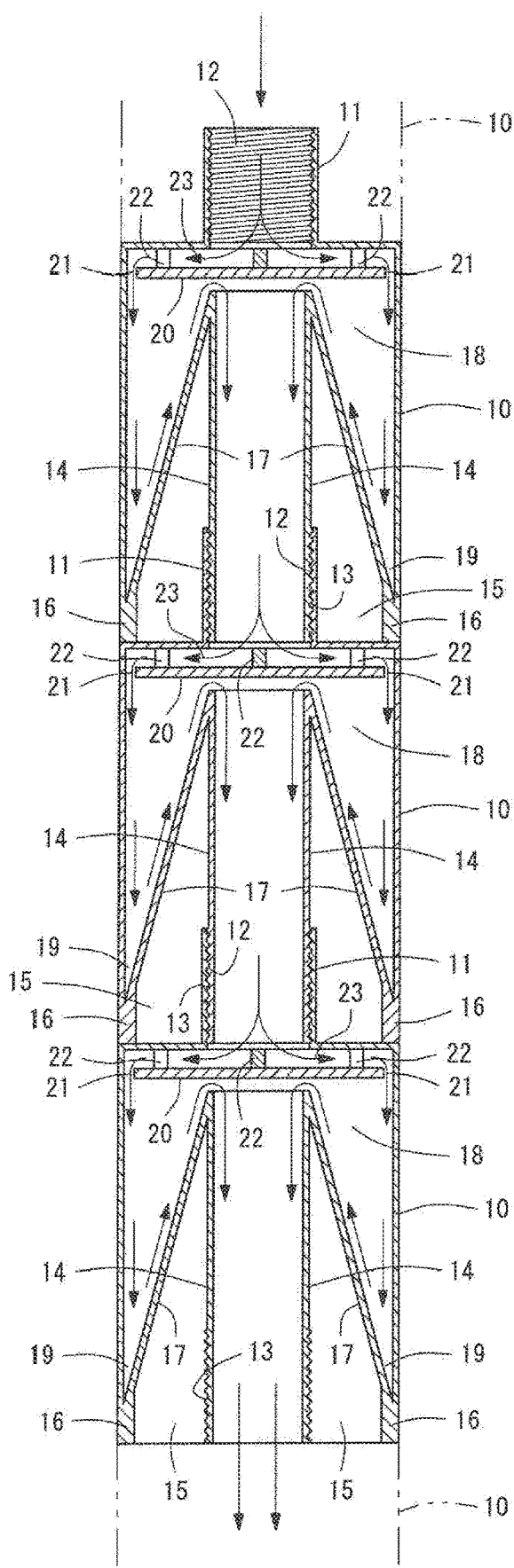
FIG. 21 is an enlarged sectional view taken on line L-L of FIG. 19.
Figure 2:
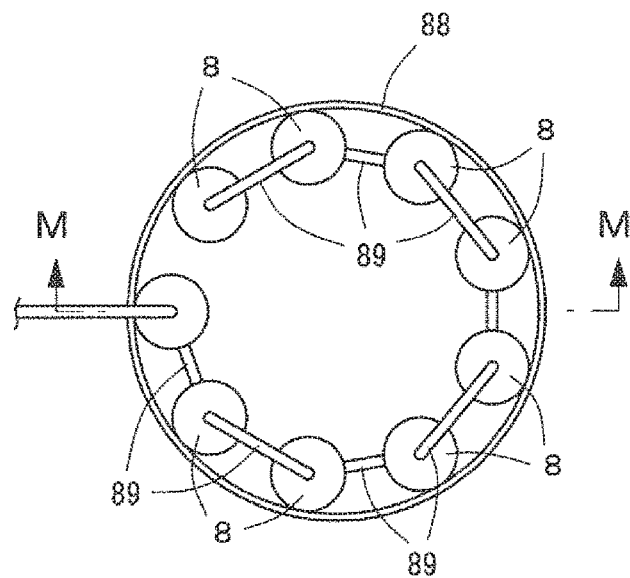
Figure 2:
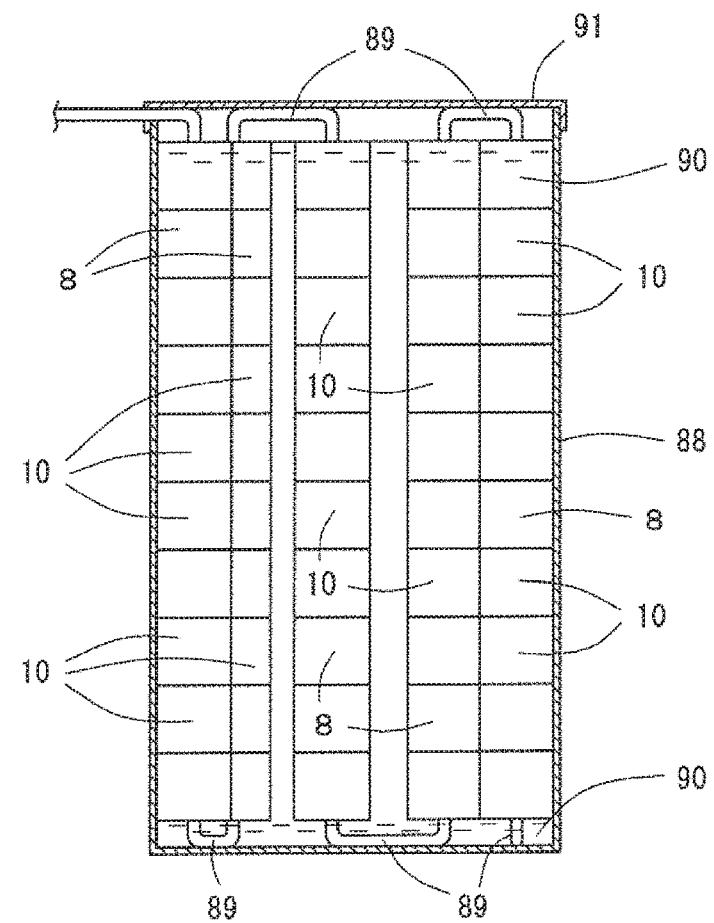
Figure 2:
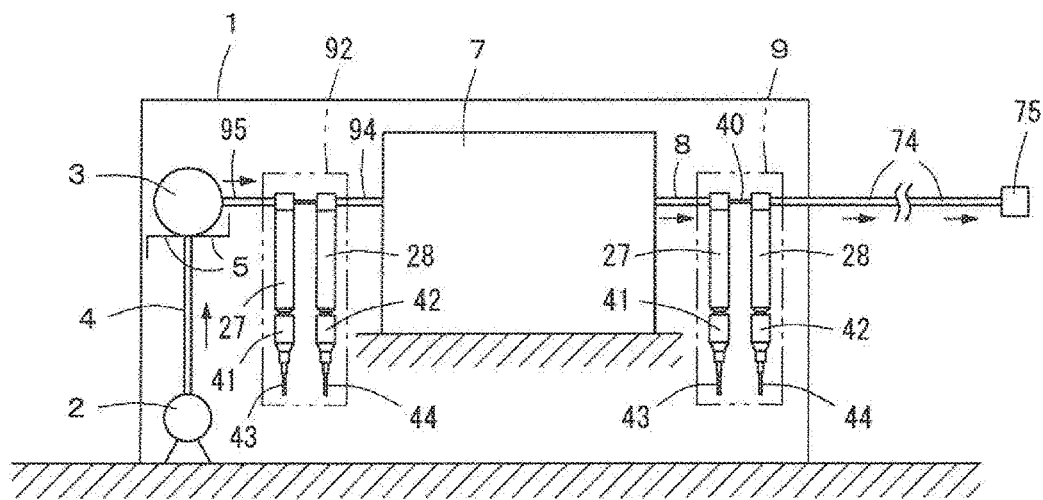
Figure 2:
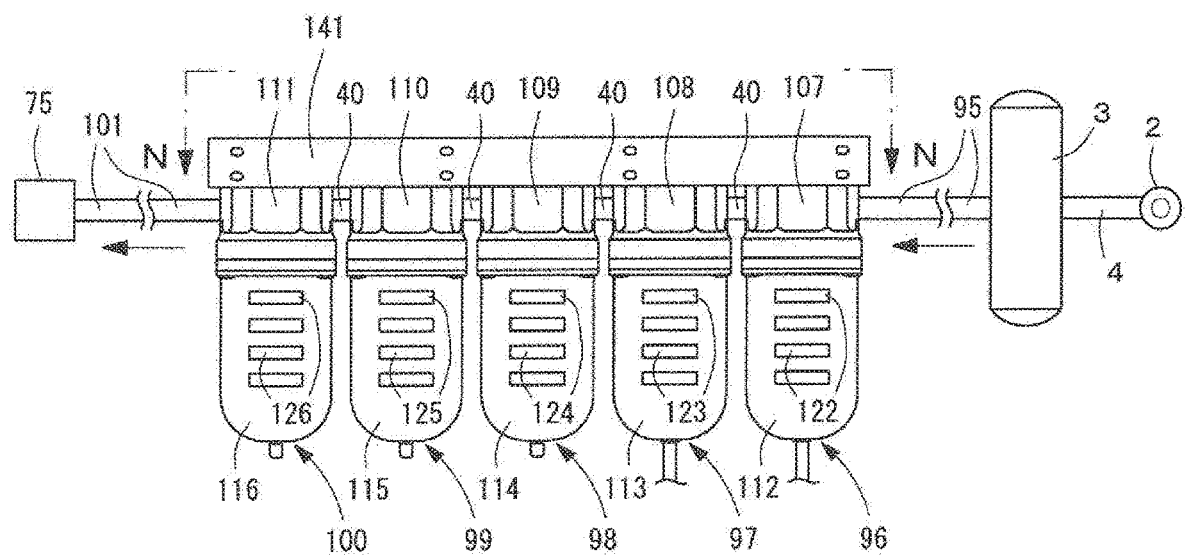

FIGS. 19 through 21 show the third embodiment of the present invention. In this embodiment, a plurality of concentrating tubes 8 of a bottomed hollow cylindrical container 88 each having the same length as that of the container 88 are arranged on the outer peripheral surface of the container 88 in the vertical direction. The adjacent concentrating tubes 8 form a pair and connected at upper and lower end faces thereof through a communication tube 89, so that the concentrating tube 8 can be made long and compact.

By doing so, the space for installing the air conduit 74 for connecting the air dryer unit 9 and the air tool 75, for example, can be made compact, and the air conduit 74 can be protected.

Since the concentrating tube 8 exhibits the same function and effects as the conventional air dryer, an elongate air dryer can be configured by the above-mentioned constitution, and the concentrating or dehumidifying action thereof can be doubled.

Moreover, by arranging the concentrating tubes 8 outside the air compressor storage chamber 1 and cooling the peripheral surfaces of the concentrating tubes 8, the compressed air in the concentrating units 10 can be cooled. As a result, the concentrating or dehumidifying load can be reduced.

The drain generated in the concentrating unit 10 is flowed down through the outlet tube 14 by gravity or compressed air, moved to the concentrating unit 10 right thereunder, flowed down to the concentrating unit 10 in the lowest position, and discharged from a drain trap (not shown) provided at the concentrating unit 10.

Therefore, no other tools are required than the concentrating unit 10 in the lowest position are required for the attachment of the drain trap. Accordingly, the number of parts can be reduced.

FIGS. 22 and 23 show the fourth embodiment of the present invention. In this embodiment, the plurality of concentrating tubes 8 are arranged at the inner surface of the cylindrical container 88 in the vertical direction. The vertically adjacent concentrating tubes 8 form a pair and connected at upper and lower end faces thereof through a communication tube 89, so that the concentrating tube 8 can be made long and compact.

Further, the cooling water 90 is stored in the cylindrical body 88 and the concentrating tubes 8 are dipped in the water 90. By doing so, the compressed air in the concentrating units 10 can be cooled as in the case with the third embodiment and thus, the concentrating or dehumidifying load can be reduced.

FIG. 24 shows the fifth embodiment of the present invention. This embodiment is an application form of the first embodiment. In this application form, instead of arranging the air dryer unit 9 on an area near the downstream of the refrigerator type air dryer 7, or together with the air dryer unit 9, an air dryer unit 92, which is similar to the air dryer unit 9, is arranged on an area near the upstream of the refrigerator type air dryer 7.

More specifically, the air dryer unit 92 includes the condenser 27 and the air dryer 28, and those parts are arranged near to each other through the relay tube 40. Of them, the condenser 27 is arranged on the upstream side of the air dryer 28.

A condenser 94, which is similar to the concentrating tube 8, is arranged between the air dryer 28 and the refrigerator type air dryer 7. A condenser 95, which is desirably similar to the concentrating tube 8, is also arranged between the condenser 27 and the air tank 3.

By arranging the air dryer unit 92 on the area near the upstream side of the refrigerator type air dryer 7, the compressed air having high temperature and high pressure, which has been discharged from the air tank 3, is introduced firstly into the condenser 27. In the condenser 27, the compressed air is concentrated so as to be removed the moisture efficiently and dehumidified, and then introduced into the air dryer 28 via the relay tube 40. In the air dryer 28, the compressed air is adiabatically expanded, cooled and concentrated, so that the dehumidification is more promoted.

By introducing the compressed air, which has been cooled and dehumidified, into the refrigerator type air dryer 7, the cooling load of the refrigerator type air dryer 7 is reduced, and operation and power consumption of the refrigerator type air dryer 7 are reduced.

Moreover, since the air dryer unit 92 and the refrigerator type air dryer 7 are connected to each other through the concentrating tube 94, which is similar to the concentrating tube 8, and the air tank 3 and air dryer unit 92 are connected to each other through the concentrating tube 95, which is similar to the concentrating tube 8, the dehumidification effect of the compressed air is more enhanced by the dehumidification effect of the compressed air by the concentrating tubes 94, 95. Consequently, the cooling load of the refrigerator type air dryer 7 is more reduced, and operation and power consumption of the refrigerator type air dryer 7 are more reduced.

Figure 26:
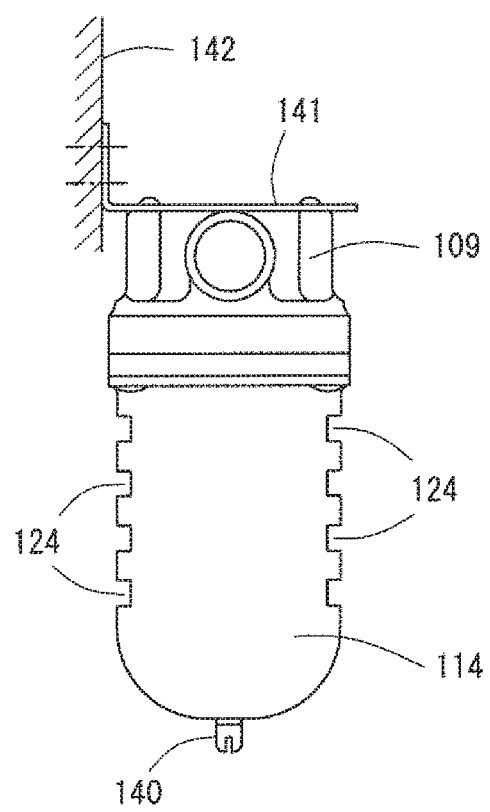
FIG. 26 is a schematic diagram showing an installation status of the concentrating tube, air dryer and three types of air cleaners of FIG. 25.

FIGS. 25 through 27 show the sixth embodiment of the present invention. In this embodiment, a condenser 96, an air dryer 97 and three kinds of air cleaners 98, 99, 100 are arranged in order from the upstream side, and an air cleaner 100 on the most downstream side and the air tool 7 are connected to each other through a concentrating tube 101, which is similar to the concentrating tube 8.

The condenser 96, air dryer 97 and air cleaners 98 through 100 comprise similar hollow bottomed transparent cylindrical containers 102 through 106 and container head covers 112 through 116 screwed to the lower end parts of head covers 107 through 111.

Clearance portions 117 through 121 are formed between the cylindrical containers 102 through 106 and the container covers 112 through 116. A plurality of see-through windows 122 through 125, which are communicated with the clearance portions 117 through 121, are opened in opposing peripheral surfaces of the container covers 112 through 116, so that the inside of the cylindrical containers 102 through 106 is made visible through the see-through windows 122 through 126.

Passages 127 through 129, which are communicated with the respective inlets, are formed in the head covers 109 through 111 of the air cleaners 98 through 100. Hollow bottomed transparent cleaner element containers 130 through 132 are stored in the cylindrical containers 104 through 106, and thread parts 133 through 135 of the connecting tube at the upper end parts thereof are screwed into the screw holes communicated with the outlets of the head covers 109 through 111.

An oil mist removing member 130, which is stored in a storage bag, is stored in the cleaner element container 130. A drying and dehumidifying member 137, which is stored in a storage bag, is stored in the cleaner element container 131. An impurity removing member 138, which is stored in a storage bag, is stored in the cleaner element container 130.

A plurality of through-holes 139 are formed in the bottom parts of the cleaner element containers 130 through 132. The compressed air introduced into the cylindrical containers 104 through 106 is then introduced into the respective cleaner element containers 130 through 132 through the through-hole 139 and contacted with an oil mist removing member 36, a drying and dehumidifying member 137 and an impurity removing member 138, so that the oil mist, moisture and impurity can be captured.

In the Figs., reference numeral 140 denotes a handy drain trap formed in a bottom part of each of the cylindrical containers 104 through 106 and container covers 114 through 111 thereof.

One piece of an L-shaped bracket 141 is attached to the upper end faces of the head covers 109 through 111 and the other piece thereof is attached to a wall surface 141.

As mentioned above, the concentrating tube 95, which exhibits the similar function as the air dryer, is arranged between the air tank 3 and the condenser 96, and the concentrating tube 101, which exhibits the similar function as the air dryer, is arranged also between the air cleaner 100 and air tool 75 at the end, so that the compressed air is concentrated and dehumidified, and then moved to the various air cleaners 98 through 100. By doing so, the compressed air, which has been precisely dehumidified and cleaned, can be fed to the air tool 75.

INDUSTRIAL APPLICABILITY

A method for concentrating compressed air and an apparatus thereof according to the present invention can realize a novel air dryer, in which a concentrating tube is formed by connecting a plurality of concentrating units, so that the structure, when compared with the conventional one, can be simplified and the number of parts can be reduced by virtue of the concentrating tube, thereby reducing the size and weight, facilitating production and reducing the cost, enabling to obtain not only outstanding concentrating and dehumidifying performance but also convenience, and in which the best concentrating and dehumidifying performance can be obtained easily and freely depending on the environment and conditions where the air dryer thus constructed is used, and collection of drain can be performed reasonably and easily.

DESCRIPTION OF REFERENCE NUMERALS

6 . . . air conduit
7 . . . refrigeration type air dryer
8, 94, 95 . . . concentrating tube
9,92 . . . air dryer unit
10 . . . concentrating unit
11 . . . inlet tube
12 . . . female thread part
13 . . . male thread part
14 . . . outlet tube
18 . . . air moving chamber
19 . . . air compressing chamber
20 . . . collision plate (collision plate)
21 . . . narrow passage
23 . . . collision chamber
25 . . . drain trap
26 . . . drain
28, 96 . . . air-liquid separator
86, 87 . . . water passage hole
88 . . . cylindrical container
90 . . . cooling water
98 to 100 . . . air cleaner

The invention claimed is:

1. A concentrating apparatus for compressed air, the concentrating apparatus comprising:
a concentrating tube including at least a first hollow cylindrical concentrating unit and a second hollow cylindrical concentrating unit that are coaxially connected, each of the first hollow cylindrical concentrating unit and the second hollow cylindrical concentrating unit being adapted to receive a compressed air from an upstream end thereof and move the compressed air to a downstream end thereof; and
an inlet tube projecting from an outer side of the upstream end of the first hollow cylindrical concentrating unit, the inlet tube being adapted to introduce the compressed air;

wherein:
the first hollow cylindrical concentrating unit includes a first collision plate which is capable of colliding with the compressed air at an upstream side of the first collision plate and arranged in a radial direction within the first hollow cylindrical concentrating unit, and a first annular passage which is defined between an outer periphery of the first collision plate and an inner surface of the first hollow cylindrical concentrating unit, the first annular passage being in communication with a first air moving chamber within the first hollow cylindrical concentrating unit;
the first hollow cylindrical concentrating unit includes a first outlet tube which is arranged on a center of the first air moving chamber in an axial direction and adapted to introduce the compressed air to the second hollow cylindrical concentrating unit, an upstream end of the first outlet tube being spaced apart from a downstream side of the first collision plate, a downstream end of the first outlet tube being open to the downstream end of the first hollow cylindrical concentrating unit, a first conical partition wall being arranged from the upstream end of the first outlet tube to a downstream outer periphery of the first air moving chamber;
the first hollow cylindrical concentrating unit includes a first air compressing passage of a V-shape in section which is defined on a downstream side of the first air moving chamber;
the second hollow cylindrical concentrating unit includes a second collision plate which is capable of colliding with the compressed air at an upstream side of the second collision plate and arranged in the radial direction within the second hollow cylindrical concentrating unit, and a second annular passage which is defined between an outer periphery of the second collision plate and an inner surface of the second hollow cylindrical concentrating unit, the second annular passage being in communication with a second air moving chamber within the second hollow cylindrical concentrating unit;
the second hollow cylindrical concentrating unit includes a second outlet tube which is arranged on a center of the second air moving chamber in the axial direction and adapted to move the compressed air downstream, an upstream end of the second outlet tube being spaced apart from a downstream side of the second collision plate, a downstream end of the second outlet tube being open to the downstream end of the second hollow cylindrical concentrating unit, a second conical partition wall being arranged from the upstream end of the second outlet tube to a downstream outer periphery of the second air moving chamber;
the second hollow cylindrical concentrating unit includes a second air compressing passage of a V-shape in section which is defined on a downstream side of the second air moving chamber;
the concentrating tube is adapted to cause the compressed air to: (i) collide with the upstream side of the first collision plate so as to be concentrated and partially liquefied; (ii) move to the first annular passage and be jetted into the first air moving chamber so as to be adiabatically expanded and partially liquefied; (iii) be compressed in the first air compressing passage and pushed out so as to retreat along the first conical partition wall; (iv) collide with the downstream side of the first collision plate so as to be concentrated and partially liquefied; (v) be introduced into the upstream end of the first outlet tube; (vi) move to the downstream end of the first outlet tube and into the second hollow cylindrical concentrating unit; (vii) collide with the upstream side of the second collision plate so as to be concentrated and partially liquefied; (viii) move to the second annular passage and be jetted into the second air moving chamber so as to be adiabatically expanded and partially liquefied; (ix) be compressed in the second air compressing passage and pushed out so as to retreat along the second conical partition wall; (x) collide with the downstream side of the second collision plate so as to be concentrated and partially liquefied; (xi) be introduced into the upstream end of the second outlet tube; and (xii) move to the downstream end of the second outlet tube.

2. The concentrating apparatus of claim 1, wherein:
the first collision plate is arranged at an upstream side within the first hollow cylindrical concentrating unit, and a first collision chamber is defined by the first collision plate and an upstream side inner surface of the first hollow cylindrical concentrating unit; or
the second collision plate is arranged at an upstream side within the second hollow cylindrical concentrating unit, and a second collision chamber is defined by the second collision plate and an upstream side inner surface of the second hollow cylindrical concentrating unit.

3. The concentrating apparatus of claim 2, wherein:
the first collision plate has a disc shape corresponding to a lateral section of the first hollow cylindrical concentrating unit; or
the second collision plate has a disc shape corresponding to a lateral section of the second hollow cylindrical concentrating unit.

4. The concentrating apparatus of claim 1, wherein:
the first air compressing passage is defined by an inner side peripheral surface of the first hollow cylindrical concentrating unit and an inner surface of the first conical partition wall; or
the second air compressing passage is defined by an inner side peripheral surface of the second hollow cylindrical concentrating unit and an inner surface of the second conical partition wall.

5. The concentrating apparatus of claim 1, wherein:
a female thread part is defined on an inner surface of the inlet tube; and
a male thread part is defined on at least one of a downstream side peripheral surface of the first outlet tube or a downstream side peripheral surface of the second outlet tube.

6. The concentrating apparatus of claim 5, wherein the male thread part can be screwed into the female thread part.

7. The concentrating apparatus of claim 1, wherein the concentrating tube is arranged horizontally or vertically.

8. The concentrating apparatus of claim 1, wherein the concentrating tube is arranged on at least one of an upstream side or a downstream side of an air dryer, an air-liquid separator or an air cleaner.

9. The concentrating apparatus of claim 7, wherein:
the concentrating tube is arranged horizontally; and
at least one of the first hollow cylindrical concentrating unit or the second hollow cylindrical concentrating unit has a drain trap attached at a bottom part thereof.

10. The concentrating apparatus of claim 1, wherein the concentrating tube is inclined toward a downstream side thereof.

11. The concentrating apparatus of claim 10, wherein the second hollow cylindrical concentrating unit has a drain trap attached thereto.

12. The concentrating apparatus of claim 11, wherein:
the second hollow cylindrical concentrating unit has a water passage hole defined in a bottom part thereof;
the second hollow cylindrical concentrating unit has a drain; and
the drain trap can collect from the drain.

13. The concentrating apparatus of claim 7, wherein:
a downstream side end part of the second hollow cylindrical concentrating unit is cut so as to expose the second outlet tube; and
a projecting part of the second outlet tube can be connected to an air dryer, an air-liquid separator or an air cleaner.

14. The concentrating apparatus of claim 7, wherein:
the concentrating tube is one of a plurality of concentrating tubes annularly arranged on an outer periphery of a cylindrical container;
the cylindrical container is arranged in a vertical direction; and
at least one of a lower end or an upper end of a first of the plurality of concentrating tubes is connected to a corresponding end of the second of the plurality of concentrating tubes which is adjacent to the first of the plurality of concentrating tubes so as to communicate the first of the plurality of concentrating tubes with the second of the plurality of concentrating tubes for air cooling.

15. The concentrating apparatus of claim 7, wherein:
the concentrating tube is one of a plurality of concentrating tubes annularly arranged on an inner periphery of a cylindrical container;
at least one of a lower end or an upper end of a first of the plurality of concentrating tubes is connected to a corresponding end of the second of the plurality of concentrating tubes which is adjacent to the first of the plurality of concentrating tubes so as to communicate the first of the plurality of concentrating tubes with the second of the plurality of concentrating tubes for cooling the plurality of concentrating tubes, the first hollow cylindrical concentrating unit and the second hollow cylindrical concentrating unit.

16. The concentrating apparatus of claim 1, wherein a downstream side end face of the first hollow cylindrical concentrating unit is adjacent to an upstream side end face of the second hollow cylindrical concentrating unit.

17. A compressed air concentrating method comprising:
providing the concentrating apparatus of claim 1;
introducing the compressed air into the concentrating tube from the inlet tube;
colliding the compressed air with the upstream side of the first collision plate so as to be concentrated and partially liquefied;
moving the compressed air to the first annular passage and jetting the compressed air into the first air moving chamber so as to be adiabatically expanded and partially liquefied;
compressing the compressed air in the first air compressing passage and pushing the compressed air out so as to retreat along the first conical partition wall;
colliding the compressed air with the downstream side of the first collision plate so as to be concentrated and partially liquefied;
introducing the compressed air into the upstream end of the first outlet tube;

moving the compressed air to the downstream end of the first outlet tube and into the second hollow cylindrical concentrating unit;

colliding the compressed air with the upstream side of the second collision plate so as to be concentrated and partially liquefied;

moving the compressed air to the second annular passage and be jetted into the second air moving chamber so as to be adiabatically expanded and partially liquefied;

compressing the compressed air in the second air compressing passage and pushing the compressed air out so as to retreat along the second conical partition wall;

colliding with the downstream side of the second collision plate so as to be concentrated and partially liquefied;

introducing the compressed air into the upstream end of the second outlet tube; and moving the compressed air to the downstream end of the second outlet tube.

18. The compressed air concentrating method of claim 17, wherein the concentrating tube is arranged horizontally or vertically.

19. The compressed air concentrating method of claim 18, wherein the concentrating tube is arranged on at least one of an upstream side or a downstream side of an air dryer, an air-liquid separator or an air cleaner.

20. The compressed air concentrating method of claim 18, wherein:
the concentrating tube is arranged horizontally; and
at least one of the first hollow cylindrical concentrating unit or the second hollow cylindrical concentrating unit has a drain trap attached at a bottom part thereof.

21. The compressed air concentrating method of claim 17, wherein the concentrating tube is inclined toward a downstream side thereof.

22. The compressed air concentrating method of claim 21, wherein the second hollow cylindrical concentrating unit has a drain trap attached thereto.

23. The compressed air concentrating method of claim 22, wherein:
the second hollow cylindrical concentrating unit has a water passage hole defined in a bottom part thereof;
the second hollow cylindrical concentrating unit has a drain; and
the drain trap can collect from the drain.

24. The compressed air concentrating method of claim 18, wherein:
the concentrating tube is one of a plurality of concentrating tubes annularly arranged on an outer periphery of a cylindrical container;
the cylindrical container is arranged in a vertical direction; and
at least one of a lower end or an upper end of a first of the plurality of concentrating tubes is connected to a corresponding end of the second of the plurality of concentrating tubes which is adjacent to the first of the plurality of concentrating tubes so as to communicate the first of the plurality of concentrating tubes with the second of the plurality of concentrating tubes for air cooling.

25. The compressed air concentrating method of claim 18, wherein:
the concentrating tube is one of a plurality of concentrating tubes annularly arranged on an inner periphery of a cylindrical container;
at least one of a lower end or an upper end of a first of the plurality of concentrating tubes is connected to a corresponding end of the second of the plurality of concentrating tubes which is adjacent to the first of the plurality of concentrating tubes so as to communicate the first of the plurality of concentrating tubes with the second of the plurality of concentrating tubes for cooling the plurality of concentrating tubes, the first hollow cylindrical concentrating unit and the second hollow cylindrical concentrating unit.

* * * * *